US006424988B2

United States Patent
Lurndal

(10) Patent No.: US 6,424,988 B2
(45) Date of Patent: Jul. 23, 2002

(54) MULTICOMPUTER SYSTEM

(75) Inventor: Scott Lurndal, San Jose, CA (US)

(73) Assignee: Unisys Corporation, Blue Bell, PA (US)

( * ) Notice: Subject to any disclaimer, the term of this patent is extended or adjusted under 35 U.S.C. 154(b) by 21 days.

This patent is subject to a terminal disclaimer.

(21) Appl. No.: 08/977,222

(22) Filed: Nov. 24, 1997

Related U.S. Application Data

(60) Provisional application No. 60/038,434, filed on Feb. 19, 1997.

(51) Int. Cl.[7] .................................................. G06F 9/44
(52) U.S. Cl. ........................................ 709/106; 709/313
(58) Field of Search ................................ 709/200–332, 709/100–106; 711/147; 707/2, 10, 204, 200–206; 717/100–178

(56) References Cited

U.S. PATENT DOCUMENTS

| | | | | |
|---|---|---|---|---|
| 5,724,512 A | * | 3/1998 | Winterbottom | 709/226 |
| 5,745,703 A | * | 4/1998 | Cejtin et al. | 709/238 |
| 5,819,296 A | * | 10/1998 | Anderson et al. | 707/204 |
| 5,956,718 A | * | 9/1999 | Prasad et al. | 707/10 |
| 5,978,791 A | * | 11/1999 | Farber et al. | 707/2 |
| 6,148,377 A | * | 11/2000 | Carter et al. | 711/147 |
| 6,182,158 B1 | * | 1/2001 | Kougiouris et al. | 709/328 |

OTHER PUBLICATIONS

Rozier et al, "Overview of the CHORUS distributed operating system", 1991.*
Herrmann et al, "CHORUS/MiX a distributed UNIX on multicomputers", 1992.*
Batlivala et al, "Experience with SVR4 over CHORUS", 1992.*

* cited by examiner

*Primary Examiner*—St. John Courtenay, III
(74) *Attorney, Agent, or Firm*—Woodcock Washburn LLP; Lise A. Rode; Mark T. Starr

(57) ABSTRACT

A method is provided for responding to a computer system call requesting creation of such new process in a multicomputer system which includes multiple sites, each site including a local processor and local memory, and wherein the multicomputer system includes a distributed process directory which is distributed across multiple sites such that different site memories include different fragments of the process directory and such that the distributed process directory includes a multiplicity of slots, the method comprising the steps of: creating the new process on a respective site; providing in memory of at least one site a designation of sites for which respective process directory fragments include at least one unallocated slot; selecting a respective site from the designation; and referencing a respective process identification corresponding to the new process in a slot in a respective process directory fragment on the selected site.

15 Claims, 19 Drawing Sheets

```
SESSION #1 (KSH COMMAND)

PROCESS GROUP #1 (KSH COMMAND)

PROCESS GROUP #2 (SEE FIGURE 1)
        PID = 2  (CAT COMMAND)
            = 3  (SORT COMMAND)
            = 4  (UNIQ COMMAND)
            = 5  (WC COMMAND)

PROCESS GROUP #101 (SEE 9-16 -96 FIG.)
        PID = 101  (ls COMMAND)
        PID = 103  (tec COMMAND)
        PID = 102  (pg COMMAND)
```

*Figure 10*

MULTICOMPUTER SYSTEM

This patent application claims priority to U.S. Provisional Appln. No. 60/038,434, filed Feb. 19, 1997.

The present invention relates generally to multicomputer systems, and more particularly, to a multicomputer system employing a microkernel-based serverized distributed operating system.

BACKGROUND OF THE INVENTION

Related Art

Microkernel-based operating system architectures have been employed to distribute operating system services among loosely-coupled processing units in a multicomputer system. For example, in an earlier microkernel-based "serverized" operating system, a set of modular computer software-based system servers sit on top of a minimal computer software microkernel which provides the system servers with fundamental services such as processor scheduling and memory management. The microkernel may also provide an inter-process communication facility that allows the system servers to call each other and to exchange data regardless of where the servers are located in the system. The system servers manage the other physical and logical resources of the system, such as devices, files and high level communication resources, for example. Often, it is desirable for a microkernel to be interoperable with a number of different conventional operating systems. In order to achieve this interoperability, computer software-based system servers may be employed to provide an application programming interface to a conventional operating system.

The block diagram drawing of FIG. 1 shows an illustrative multicomputer system. The term "multicomputer" as used herein shall refer to a distributed non-shared memory multiprocessor machine comprising multiple sites. A site is a single processor and its supporting environment or a set of tightly coupled processors and their supporting environment. The sites in a multicomputer may be connected to each other via an internal network (e.g., Intel MESH™ interconnect), and the multicomputer may be connected to other machines via an external network (e.g., Ethernet network). Each site is independent in that it has its own private memory, interrupt control, etc. Sites use messages to communicate with each other. A microkernel-based "serverized" operating system is well suited to provide operating system services among the multiple independent non-shared memory sites in a multicomputer system.

An important objective in certain multicomputer systems is to achieve a single-system image (SSI) across all sites of the system. An advantage of an SSI from the point of view of the user, application developer, and for the most part, the system administrator, the multicomputer system appears to be a single computer even though it is really comprised of multiple independent computer sites running in parallel and communicating with each other over a high speed interconnect. Some of the benefits of a SSI include, simplified installation and administration, ease-of-use, open system solutions (i.e., fewer compatibility issues), exploitation of multisite architecture while preserving conventional APIs and ease of scalability. There are several possible beneficial features of an SSI such as, a global naming process, global file access, distributed boot facilities and global STREAMS facilities, for example.

In one earlier system, a SSI is provided which employs a process directory (or name space) which is distributed across multiple sites. Each site maintains a fragment of the process directory. The distribution of the process directory across multiple sites ensures that no single site is unduly burdened by the volume of message traffic accessing the directory. There are challenges in implementing a distributed process directory. For example, such a distributed process directory should be effective in implementing global atomic operations. A global atomic operation (GAO) describes a category of functions which are applied to each process in a set of processes identified in the SSI.

GAOs typically are applied to a set of processes from what is often referred to as, a "consistent snapshot" of the system process directory state. The processes that are operated upon by a GAO are often referred to as target processes. A consistent snapshot generally refers to a view of the directory which identifies the processes in the entire SSI at a discrete point in time. However, since process creation and process deletion events occur frequently, a process directory is a dynamic or "living" object whose contents change frequently. Therefore, the consistent snapshot rule generally is relaxed somewhat such that a consistent snapshot may contain all processes which exist both before and after the snapshot is taken. For the purposes of a GAO, it can be assumed that processes which were destroyed during a consistent snapshot were destroyed prior to it, and processes created during the consistent snapshot were created subsequent to it.

An example of a GAO is what is referred to as sending a signal, which is a mechanism by which a process may be notified of, or affected by, an event occurring in the system. Some application program interfaces (API's) which are provided to the programmer as part of a UNIX specification, for instance, deliver a signal,to a set of processes as a group; such an API, for example, mandates that all processes that match the group criteria receive the signal. The delivery of a signal to a set of processes as a group is an example of a GAO. The processes in the group are examples of target processes.

In a multicomputer system that employs a distributed process directory, GAOs, which must be applied to multiple target processes, may have to traverse process directory fragments on multiple sites in the system. This traversal of directory fragments on different sites in search of processes targeted by an operation can be complicated by the migration of processes between sites while the GAO still is in progress. In other words, a global atomic operation and process migration may progress simultaneously. The proper application of a global atomic operation is to apply it at least once, but only once, to each target process. As processes migrate from site to site during the occurrence of a GAO, however, there arises a need to ensure that a migrating process is neither missed by a GAO nor has the GAO applied to it more than once.

The problem of a GAO potentially missing a migrating process will be further explained through an example involving the global getdents (get directory entries) operation. The getdents operation is used to obtain a "consistent snapshot" of the system process directory. The getdents operation is a global atomic operation. The timing diagram of FIG. 2 illustrates the example. At time=t, process manager server "A" (PM A) on site A initiates a migration of a process from PM A on site A to the process manager server "B" (PM B) on site B (dashed lines). This process migration involves the removal of the process identification (PID) for the migrating process from the process directory fragment on site A and the insertion of the PID for the migrating process into the process directory fragment on site B. Meanwhile, also at time=t, an object manager server (OM) has broadcast a getdents request to both PM A and PM B. At time=t1, PM B receives and processes the getdents request and returns the response to the OM. This response by PM B does not include a process identification (PID) for the migrating process which has not yet arrived at PM B. At time=t2, PM B receives the migration request from PM A. PM B adds the PID for the migrating process to the directory fragment on site B and returns to PM A a response indicating the completion of the process migration. PM A removes the PID for the migrating process from the site A directory fragment. At time=t3, PM A receives and processes the getdents request and returns the response to the OM. This response by PM A does not include the PID for the migrating process since that process has already migrated to PM B on site B. Thus, the global getdents operation missed the migrating process which was not yet represented by a PID in the site B directory fragment when PM B processed the getdents operation, and which already had its PID removed from the site A directory fragment by the time PM A processed the getdents operation.

An example of a prior solution to the problem of near simultaneous occurrence of process migrations and global atomic operations involves the use of a "global ticket" (a token) to serialize global operations at the system level and migrations at the site level. More specifically, a computer software-based global operation server issues a global ticket to a site which requests a global operation. In the exemplary prior solution, a number associated with the global ticket monotonically increases every time a new ticket is issued so that different global atomic operations in the system are uniquely identified and can proceed one after the other. Furthermore, each PID has associated with it the global ticket value of the GAO which most recently considered the PID. As each subsequent GAO considers a respective PID, that PID has its global ticket association changed to match the global ticket of the GAO that most recently considered it. Thus, global tickets are used to serialize all GAOs so that they do not conflict and to keep track of which process PIDs already have been considered by a respective GAO and which process PIDs have not yet been considered by such respective GAO.

More specifically, this illustrative prior solution involves a multicast message carrying the global ticket to process managers (PMs) on each site. Each process manager acquires the lock to the process directory fragment of its own site. The applicability of the global atomic operation is considered for each PID entered in the process directory fragment on the site. The global operation may be performed on a respective process corresponding to a respective PID in a respective directory fragment entry only if a global ticket number marked on the entry is lower than the current iteration global ticket number. A global ticket number marked on a process directory fragment PID entry is carried over from a site the process migrates from (origin site) to a site the process migrates to (destination site). It represents the last global operation ticket such process has seen before the migration, During process migration, in accordance with the exemplary prior solution, a process being migrated acquires a process directory fragment lock on its origin site first. It then marks its corresponding process directory entry as being in the process of migration. The migration procedure stamps the process' process directory entry with the present global operation ticket number, locks the process directory on the migration destination site and transmits the process directory entry contents to the destination site. The global operation ticket number on the destination site is then copied back in the reply message to the migration origin site. The migration procedure on the origin site is responsible for comparing the returned global ticket number from the target site and its own. If the global ticket number of the origin site is greater than the number from the destination site, then the global operation already has been performed on the migrating process, although the operation has not yet reached the destination site. The migration is permitted to proceed, but the process directory fragment slot for the migrating process on the destination site is marked with the higher global ticket number. As a result, the global process will skip the migrated process on the destination site and not apply the global operation twice to that process. If the global ticket number of the origin site is less than the number from the destination site, then a global operation has been performed on the destination site and has yet to be performed on the origin site and will miss the process currently being migrated. The migration will be denied and retried later.

Unfortunately, there have been problems with the use of global tickets (tokens) to coordinate global operations with process migrations. For instance, the global ticket scheme serializes global operations since only one global operation can own the global ticket at a time. The serialization of global operations, however, can slow down overall system performance. While one global operation has the global ticket, other global operations typically block and await their turns to acquire the global ticket before completing their operations.

Thus, there has been a need for improvement in the application of global atomic operations to processes that migrate between sites in a multicomputer system which employs a distributed serverized operating system. The present invention meets this need.

SUMMARY OF THE INVENTION

The present invention provides a method for responding to a computer system call requesting creation of such new process in a multicomputer system which employs a distributed process directory which is distributed across multiple sites such that different site memories include different fragments of the process directory. A new process is created on a respective individual computer site in the multicomputer system. There is provided in electronic memory of a computer site a designation of sites for which respective process directory fragments include at least one unallocated slot. A site is selected from the designation of sites. The new process is referenced in a slot in a respective process directory fragment on the selected site.

The novel method described above advantageously permits independent disposition of processes and corresponding process directory fragments referencing such processes in the multicomputer system. That is, a process and a process directory structure fragment referencing the process can be disposed on the same or on different sites. This feature makes possible migration of the process from one site to another site in the multicomputer system while the process directory fragment referencing such migrating process remains unchanged. The use of such fixed process directory fragment references to migratable processes makes it easier to keep track of migrating processes during their migrations. As a result, there can be improved application of global atomic operations to migrating processes.

Accordingly, in another aspect of the present invention, there is provided a novel method of process migration. A process which is operative on a first site and which is referenced in a slot of a respective process directory fragment on the first site, is transferred from the first site to a second site. Meanwhile, the reference to the transferred process is maintained unchanged in the slot of the respective process directory fragment on the first site.

Thus, a global atomic operation targeted at a process during process migration are less likely to miss the migrating process since a process directory fragment provides a fixed reference to such a migrating process. Moreover, since the process directory fragment referencing such a targeted does not change, there may be no need to lock the process directory fragment in order to ensure that migrating processes are subject to such global atomic operation. As a consequence, global atomic operations may have less of an impact on overall system performance.

Thus, in yet another aspect of the invention a novel method is provided for implementing a global atomic operation upon a group of processes operative in a multicomputer system. A process directory structure is distributed across multiple sites such that different site memories include different fragments of the process directory structure. Each process directory structure fragment includes a multiplicity of slots. Processes operative on respective sites in the system are referenced in respective slots in the process directory structure. Group information may be associated in respective site memories with respective processes operative on respective sites. This group information indicates group membership, if any, of the associated processes. For example, a group may comprise the processes in a session. A global atomic operation request is issued to a first process manager operative on a first site. The request is directed to a group of processes. A global atomic operation message directed to the group of processes is transferred by the first process manager to process managers operative on other sites. Each process manager that receives such global atomic operation message transfers a respective message to each respective process referenced in a respective process directory structure fragment disposed on the same respective site as such receiving process manager. The transferred messages request performance of the atomic operation. The atomic operation is performed by respective processes that are members of the group. Therefore, during a global atomic operation, fixed process directory fragments are used to locate migratable target processes Another aspect of the invention provides a novel method of failure recovery in a multicomputer system. A process directory structure is distributed across multiple sites such that different site memories include different fragments of the process directory structure. Processes operative on respective sites in the system are referenced in respective slots in the process directory structure. Process structures are provided. These process structures correspond to respective processes and are disposed on the respective sites on which their respective corresponding processes are operative. Furthermore, these process structures provide references to sites which include slots that reference the processes corresponding these process structures. Whenever a failed site is identified, a reconstruction host site is selected. Process structures on non-failed sites are accessed to identify processes, if any, operative on sites that have an operative process referenced in a process directory fragment of the failed site. The process directory of the failed site is reconstructed on the reconstruction host site such that respective references to respective processes identified in the accessing step are provided in the reconstructed process directory fragment. Also, an attempt is made to contact each process corresponding to a process referenced in any process directory fragment. References to processes that are not successfully contacted are removed from process directory fragments of non-failed sites.

These and other features and advantages of the invention will be understood from the following detailed description of the invention in conjunction with the drawings.

BRIEF DESCRIPTION OF THE DRAWINGS

FIG. 10 illustrates exemplary session and process group relationships among the processes in FIGS. 9A–9B.

DETAILED DESCRIPTION OF THE PREFERRED EMBODIMENT

Figure 1:
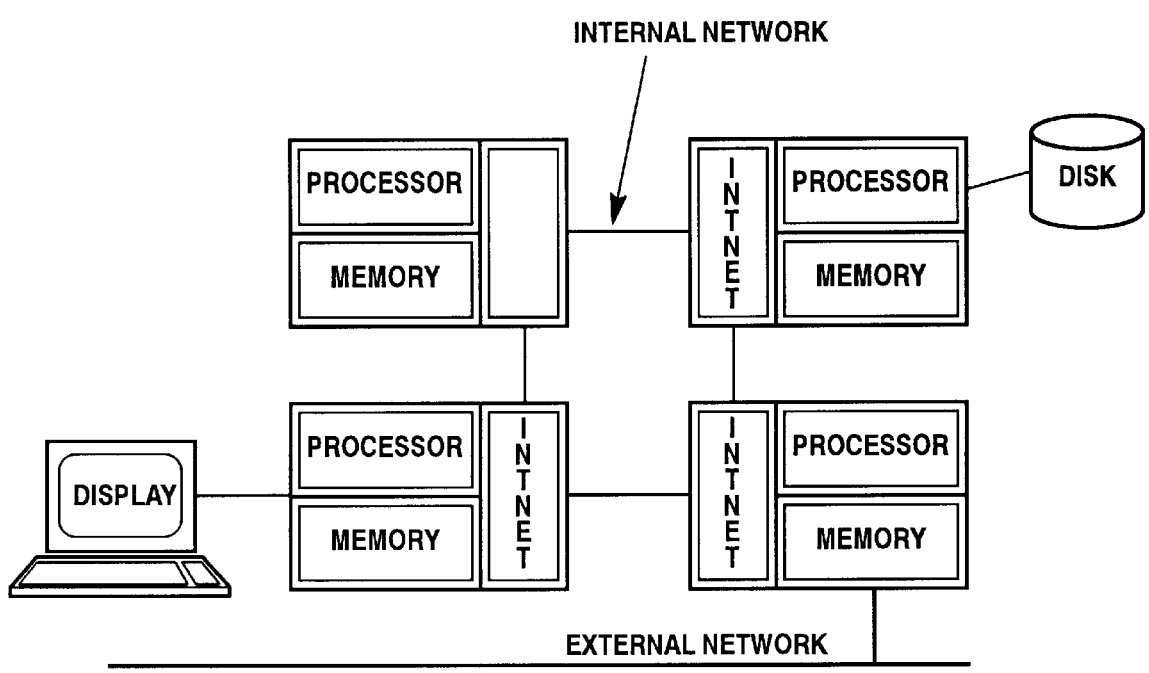
FIG. 1 is an illustrative block diagram of the hardware components of a representative conventional multicomputer system.
Figure 2:
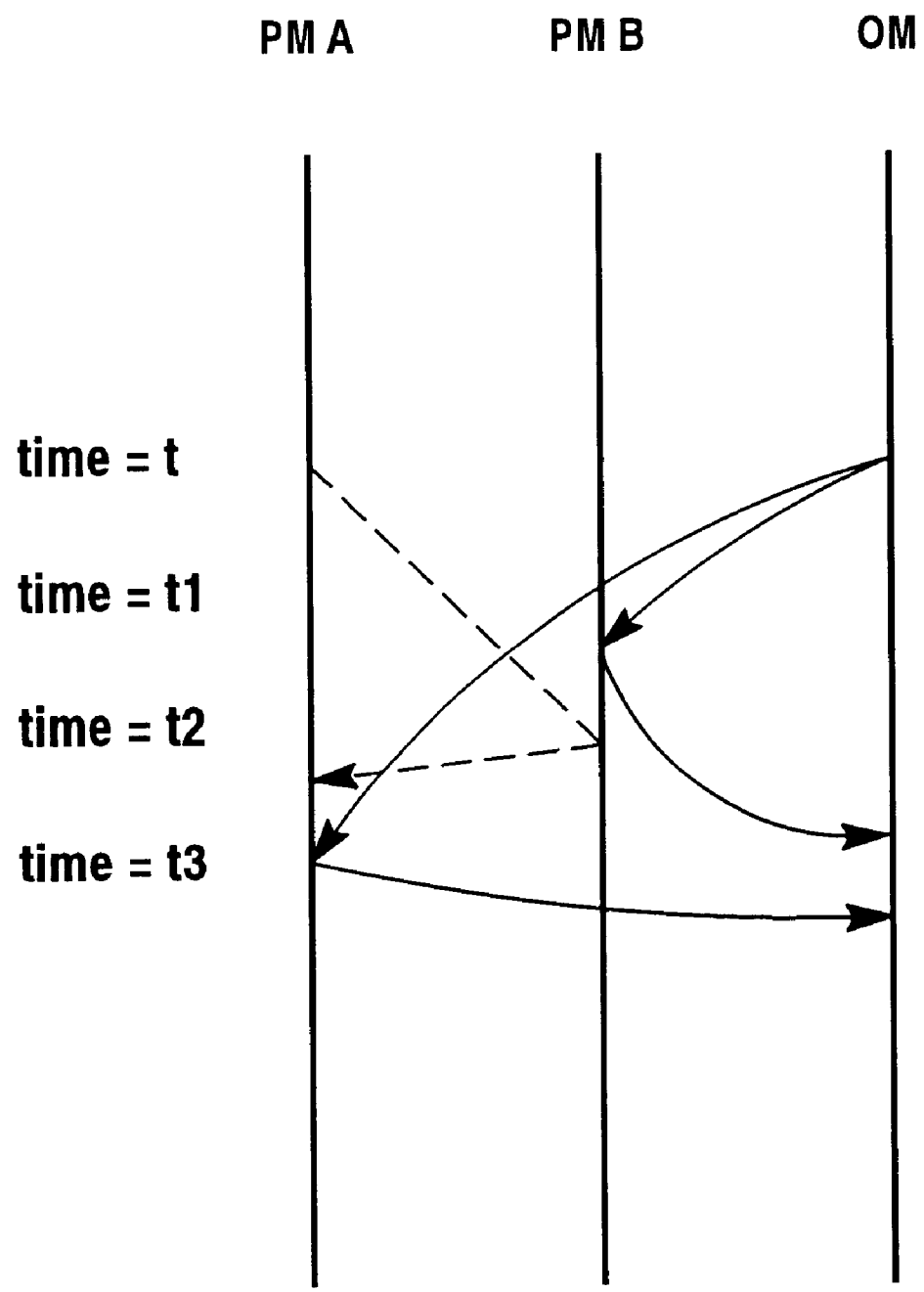
FIG. 2 is an illustrative timing diagram which demonstrates that a global atomic operation can miss a target process that migrates during performance of the operation.

The present invention comprises a novel method and apparatus for process management in a multicomputer system employing distributed operating system services. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

MICROKERNEL-BASED DISTRIBUTED OPERATING SYSTEM

Open distributed, scalable operating systems have been developed which are well suited to use in multicomputer architectures comprised of loosely-coupled multiprocessors. A presently preferred embodiment of the invention employs an operating system kernel known as CHORUS/MiX™ which provides a small kernel or nucleus onto which a distributed version of the UNIX operating system may be built as sets of distributed, cooperating servers. See, Benedicte Herrmann and Laurent Philippe, "CHORUS/MiX, a Distributed UNIX, on Multicomputers," Proceedings of Transputer '92, Arc et Senans, France, May 20–22, 1992. For instance, a UNIX SVR4 compatible operating system has been built using the CHORUS™ microkernel. See, Nariman Batlivala, et al., "Experience with SVR4 Over CHORUS", Proceedings of the USENIX Workshop on Micro-Kernels and Other Kernel Architectures, Seattle, Wash. Apr. 27–28, 1992. In the CHORUS/MiX distributed operating system, each node of a multicomputer system, whether that node is a mono-processor or a multi-processor, runs a small microkernel which operates independently of any particular operating system. A set of system servers provide a conventional UNIX operating system interface. The combination of a low level nucleus and cooperating servers results in a modular "serverized" operating system which is well suited to distribution across a loosely coupled parallel computer architecture. See Lawrence Albinson, et al., "UNIX on a Loosely Coupled Architecture: The CHORUS/MiX Approach," EIT Workshop on Parallel and Distributed Workstation Systems, Florence, Italy, Sep. 26–27, 1994.

Generally, in order to label a system as "UNIX," the system should pass test suites provided in a set of specifications. A recent set of specifications is identified as: CAE Specification, January 1997, System Interfaces and Headers, Issue 5, The Open Group (ISBN 1-85912-186-1) (formerly X/Open). Test suites are written in compliance with the CAE specifications; there are many, but for UNIX branding, an implementation preferably should conform to the above-referenced specification as well as several others, such as Base Definitions, Commands and Utilities, Networking and Curses.

Figure 3:
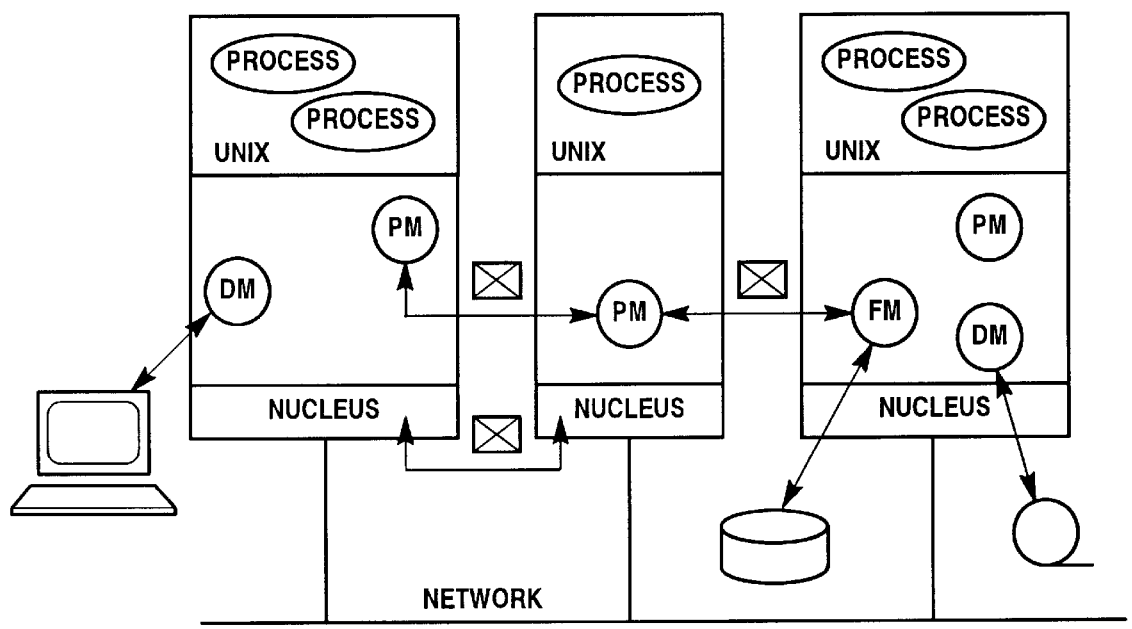
FIG. 3 is an illustrative block diagram that demonstrates the interaction of software based system server modules in a microkemel-based serverized operating system of a type employed by a presently preferred embodiment of the invention.

The illustrative block diagram of FIG. 3 shows an example of a multicomputer system which employs a distributed operating system and in which three sites are interconnected by a communication network. A distributed operating system of the presently preferred embodiment is comprised of a nucleus and a UNIX subsystem. Each site includes in memory a nucleus (or microkernel) which performs low level activities such as, allocation of local resources, management of local memory, managing external events and which supports certain global services through basic abstractions referred to as, actors, threads, ports and messages described briefly below. Each site also includes in memory one or more UNIX subsystem (SSU) servers. Each SSU server manages a different type of system resource (e.g., process, file, devices, etc.). In a present embodiment of the invention, there are several types of servers in the SSU such as, Process Manager (PM), File Manager (FM), STREAMS Manager (STM), and IPC Manager. Interactions between servers, on a single site or on different sites, are based on nucleus (or microkernel) Inter-Process Communications (IPC) facilities. STREAM files, such as pipes, network access and tty's, are managed by STMs.

A user application (user process) in memory on given site interacts with the local Process Manager (PM) active on that given site. In a current implementation, the local PMs provide a consistent UNIX SVR4 application program interface on each site and thereby provide a uniform application interface across the entire multicomputer system. More particularly, a PM on a given site handles all system calls issued by a process. The PM dispatches such requests to the appropriate servers. It implements services for process management such as the creation and destruction of processes or the sending of signals. The PM also manages the system context for each process that runs on its site. When the PM is not able to serve a UNIX system call by itself, it calls other servers, as appropriate, using the microkernel IPC. For example, upon receipt of a read(2) request, the PM generates a message to the FM which handles the request. Due to the transparency of the IPC employed by the microkernel system, the FM may be located on a remote site. Vadim Abrossimov, et al., "A Distributed System Server for the CHORUS System," Proceedings of SDMS III, Symposium on Experiences with Distributed and Multiprocessor Systems, Newport Beach, Calif. Mar. 26–27, 1992, explains interactions between certain servers operating with a CHORUS microkernel.

Thus, in a current embodiment of the invention, a traditional monolithic implementation of UNIX has been partitioned into a set of cooperating server processes. The PM, FM, STM and IPCM are server processes (or servers), for example. Servers communicate with one another via messages using IPC facilities. This partitioning of the operating system into servers that communicate via messages shall be referred to as "serverization" of the operating system. In a distributed serverized operating system, such as that in the present embodiment, servers on different nodes/sites communicate via messaging.

Figure 4:
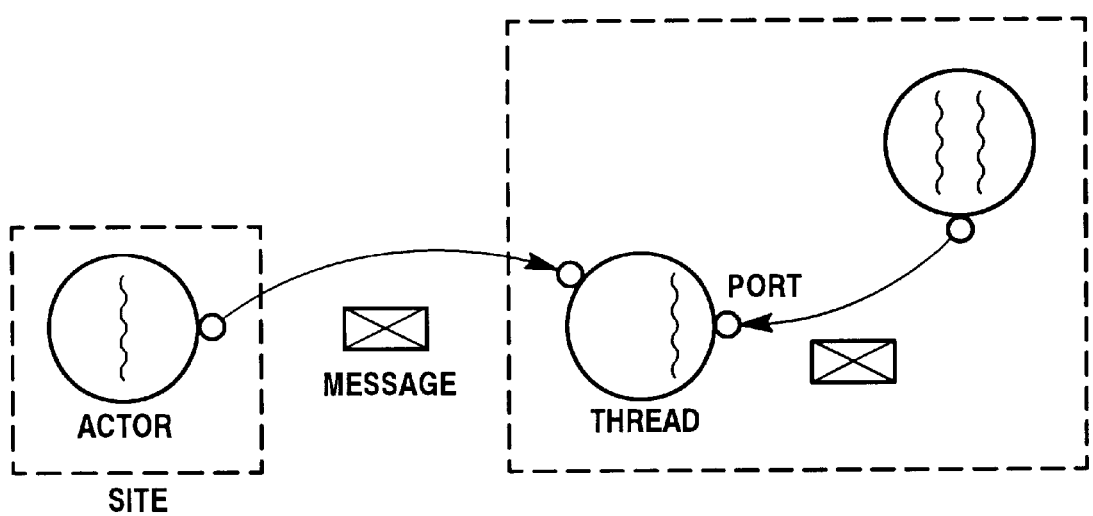
FIG. 4 is a generalized representation of certain global resources that are available in the operating system of FIG. 3.

The illustrative drawings of FIG. 4 display several types of resources employed in the microkernel which provide certain global services used in processes operative in a current embodiment of the present invention. These resources include what is termed an "actor" which is a collection of resources within a microkernel site. An actor may include memory regions, ports, and threads. When created, an actor contains only its default port. A "message" is an untyped sequence of bytes which represents information that can be sent from one port to another via the microkernel's IPC. The "inter-process communication" (IPC) is a facility that allows threads to exchange information in the form of collections of bytes called "messages."

Messages are addressed to ports. The IPC mechanism is location transparent. Threads executing within actors residing on different sites may use the IPC to exchange messages transparently. A "thread" is a flow of control within an actor in the system. Each thread is associated with an actor and defines a unique execution state. An actor may contain multiple threads. The threads share the resources of the actor, such as memory regions and ports and are scheduled independently. A "port" is an IPC entity. Threads send and receive messages on ports.

Ports are globally named message queues. Ports are named by unique identifiers (UIs). In fact, any resource within a distributed operating system can be designated with a UI. There is a microkernel location service that enables the microkernel to determine the site location of a resource (e.g., port, actor, file, process, etc.) which is represented as a UI. Therefore, from the perspective of a server (PM, FM, STM), ports are location transparent; the microkernel determines actual site location of a port based upon its UI. Thus, a thread within an actor may send a message to the port of another actor without knowing the actual location of that port. A "port group" is a collection of ports that are addressed as a group to perform some communication operation. Port groups can be used to send messages to one of a set of ports or to multicast messages to several ports simultaneously. A port can be a member of several port groups.

PROCESS DIRECTORY FRAGMENTS OF A DISTRIBUTED PROCESS DIRECTORY

Figure 5:
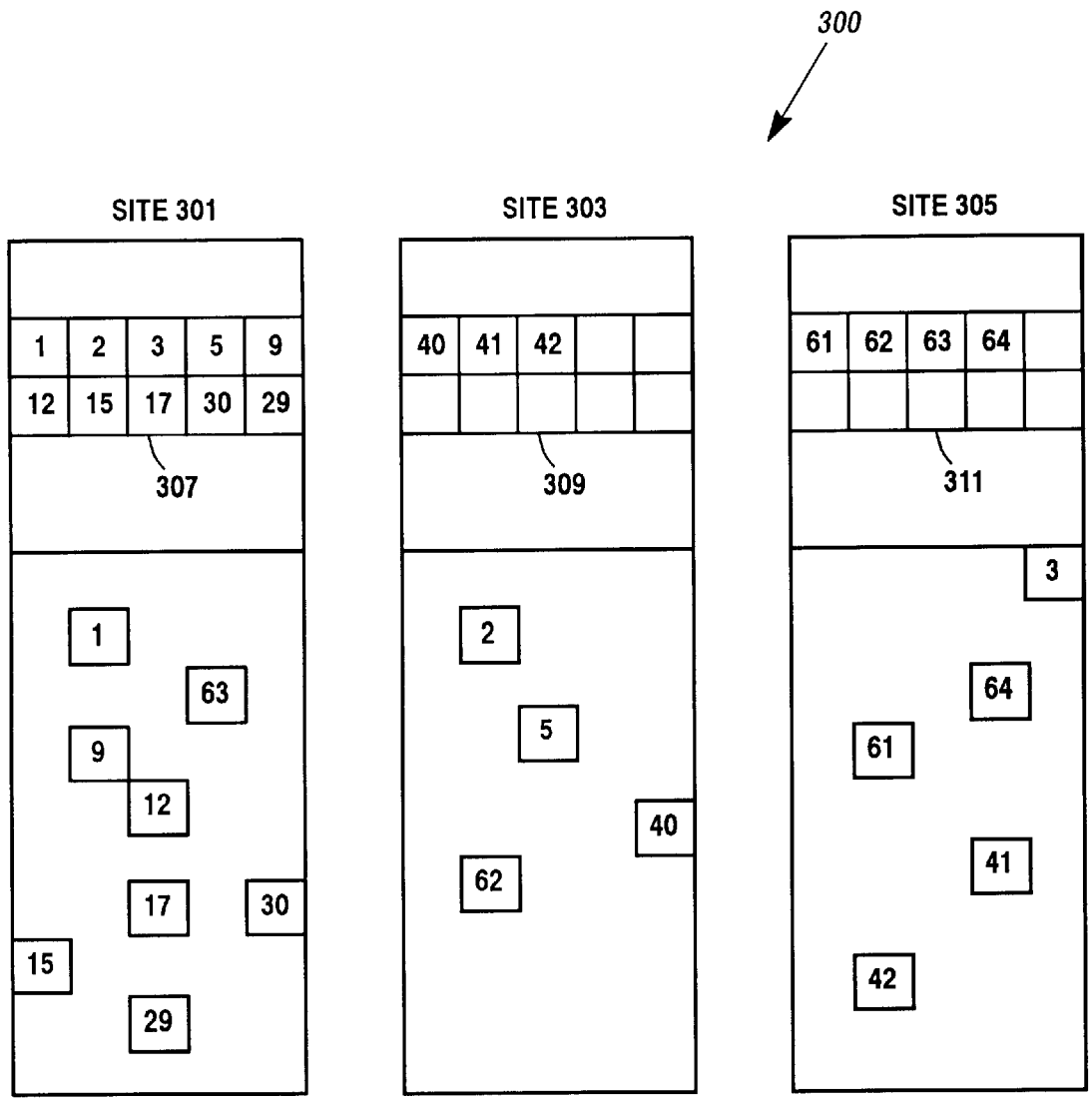
FIG. 5 is a generalized block diagram of three representative sites in a multicomputer system and the exemplary process directory fragments and processes operative on those sites in accordance with a presently preferred embodiment of the invention.

FIG. 5 provides generalized drawings of three sites (site 301, site 303 and site 305) in an exemplary multicomputer system in accordance with a presently preferred embodiment of the invention. It will be appreciated that an actual multicomputer system may employ far more than three sites, and that each site may comprise a single processor or multiple processors. For the sake of simplicity, in explaining the preferred embodiment of the invention, however, the exemplary multicomputer system is shown with only three sites. The three sites share a distributed system process directory, a data structure which contains an array of slots. Each slot is an element of the data structure which can describe the name (i.e. process id) of a process. The process directory data structure is distributed among the memories of the sites in the multicomputer as a collection of process directory fragments.

In the present embodiment, each site (or node) has a value referred to as NPROC (number of processes) associated with it. NPROC is a configurable variable which describes the maximum number of processes that can exist on a single site. The NPROC value takes into account factors such as, the amount of memory, speed of processor and typical system workload, for example. In the current implementation of the invention, the number of slots in each directory fragment is NPROC. Concatenating all of the process directory fragments, that are distributed across the multiple sites, results in the (Complete) process directory.

The illustrative distributed process directory in FIG. 5 is divided into three process directory fragments (PDFs) which are distributed across three sites. PDF 307 resides on site 301. PDF 309 resides on site 303. PDF 311 resides on site 305. Thus, each site is associated with a different fragment of the distributed system process directory. Multiple user application processes run concurrently on the different sites. In general, a "process" is a computer software-based entity that occupies a portion of a computer system's electronic memory and that involves a scheduleable event. Each slot can be associated with a different process running on the system. Processes are individually identified by process identifications (PIDs). As illustrated in FIG. 5, the processes identified by process identifications 1, 9, 12, 15, 17, 29, 30 and 63 run on site 301. Processes identified by PIDs 2, 5, 40 and 62 run on site 303. Processes identified by PIDs 3, 41, 42, 61 and 64 run on site 302.

The individual PIDs of processes operative on the system are associated with individual slots of the distributed system-process directory. In particular, PDF 307 which resides on site 301 stores PIDs 1, 2, 3, 59 9, 12, 15, 17, 30 and 29. PDF 309 which resides on site 303 stores PIDs 40, 41 and 42. PDF 311 which resides on site 305 stores PIDs 61, 62, 63 and 64.

Figure 6:
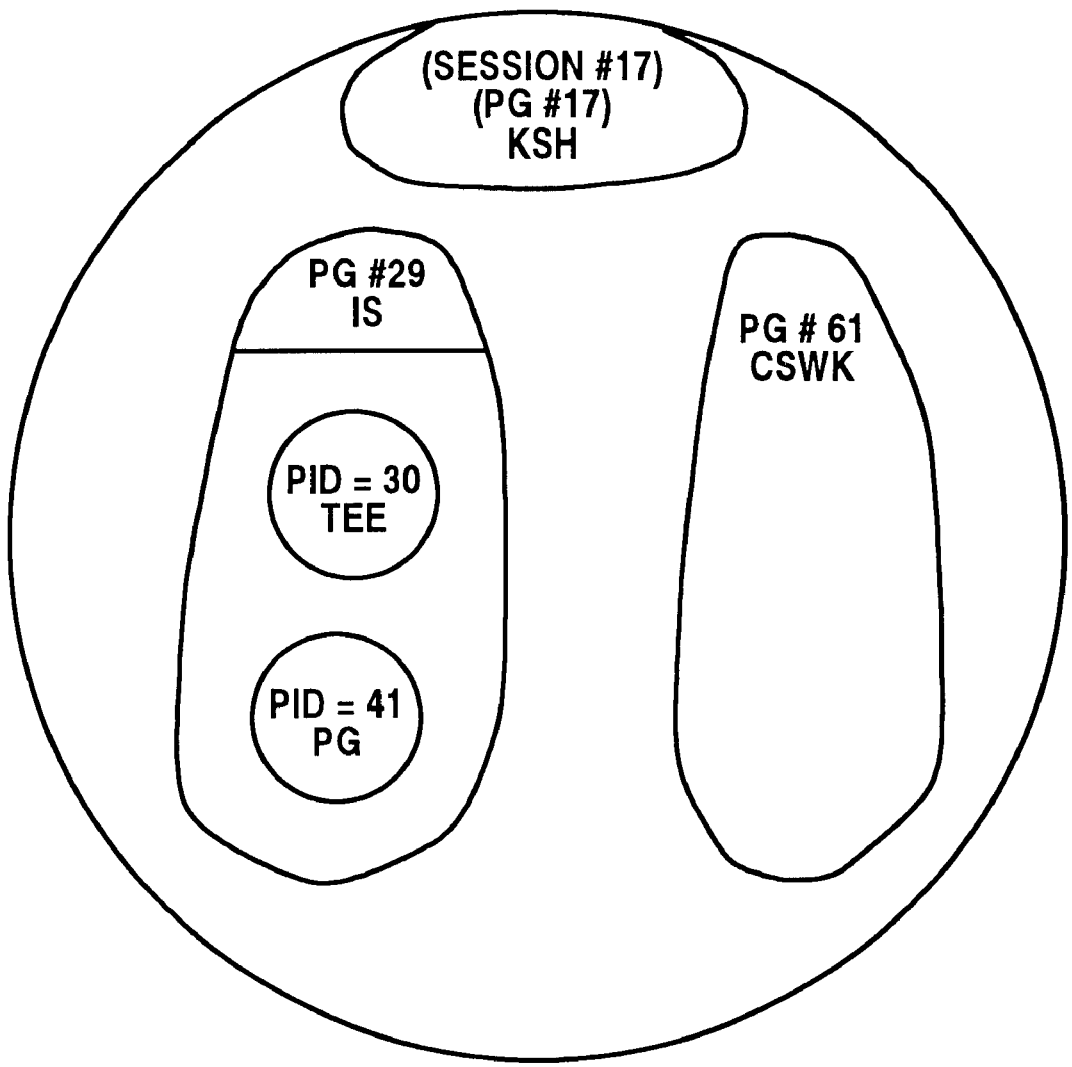
FIG. 6 is an illustrative drawing showing exemplary session and process group relationships among the processes depicted in FIG. 5.

The illustrative drawings of FIG. 6 shows an example of one possible set of relationships among some of the processes in FIG. 5. The system hosts a session with multiple process groups operative on different system sites; the session's process groups themselves include multiple processes operative on different system sites. In the example, PID 17 corresponds to a command process which creates a session which includes multiple process groups. A first process group in the session is identified by the process corresponding to PID 17. A second process group in the session is identified by the process corresponding to PID 29. A third process group in the session is identified by the process corresponding to PID 61. The first process group corresponding to PID 17 includes only a single process identified by PID 17. The second process group corresponding to PID 29 includes three processes identified by, PID 29, PID 30 and PID 41. The third process group corresponding to PID 61 includes only a single process, PID 61.

The illustrative session might be further specified by the following exemplary program instructions.

```
/*
*Session (17) process group (17)
*/
    ksh/* (PID17) */
/*process group (29)*/
    ls - lR | tee /tmp/f| pg /*(PIDs 29, 30 and 41)*/
/*process group (61)*/
    cscope -d -f rdbms /*(PID 61)*/
``` ksh is the Korn shell command which is a standard UNIX system command interpreter.

ls is the list files command.

tee is a command to make two copies of an input, one to a file, the other to output.

pg is an output pager command which displays input to output one page at a time.

cscope -d -f rdbms is a C language visual cross reference tool.

Basically, ksh is the command interpreter which reads commands from the controlling terminal, parses them and executes the appropriate commands. It executes the subsequent pipeline and cscope commands. The construct, ls-lR/tee /tmp/f /pg, represents a pipeline which lists (long format, reclusively (-lR)) all subdirectories and pipes the output to the tee command which will make a copy into the file /tmp/f, and pipe it to the paginator command pg which simply pauses every screenful of text for the user to read. The cscope-d-f rdbms command starts the C language visual browser program.

Referring to FIGS. 5 and 6, it will be appreciated that Session 17 is divided between site 301 and site 305. Session 17 includes three process groups, 17, 29 and 61. Process group 17, with its single process corresponding to PID 17, resides entirely on site 301. Process group 29 is divided between site 301 and site 305: the processes corresponding to PID 29 and PID 30 reside on site 301; and the process corresponding to PID 41 resides on site 305. Process group 61, with its single process corresponding to PID 61, resides entirely on site 305.

PROCESS CREATION

Figure 7A:
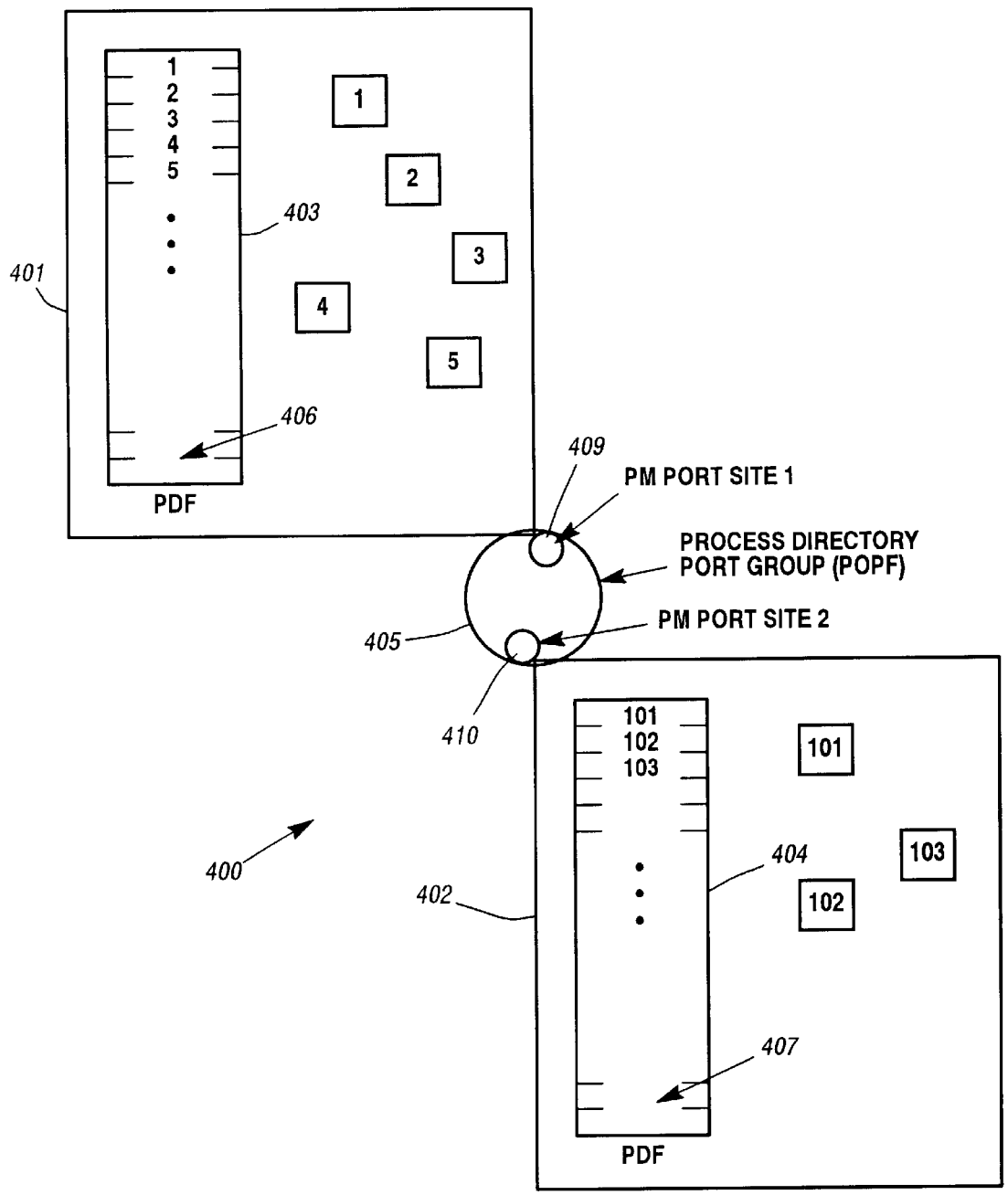
FIGS. 7A–7D are generalized block diagrams of two representative sites in a multicomputer system and the exemplary process directory fragments and processes operative on those sites used to illustrate process creation (FIGS. 7A–7C) and process migration (FIGS. 7A and 7D) in accordance with the presently preferred embodiment of the invention.

Process creation in accordance with a present implementation of the invention shall be explained with reference to the illustrative drawings of FIGS. 7A, 7B and 7C. In particular, for example, the creation of a new child process PID 6 shall be explained. Referring to FIG. 7A, there is shown a generalized representation of an exemplary multi-computer system 400 in accordance with a presently preferred embodiment of the invention. In this example only two sites are shown, site 401 and site 402. Site 401 includes a PDF 403, and site 402 includes a PDF 404. There are five active user application processes on site 401. They are identified by PIDs, 1, 2, 3, 4 and 5. Each of these five processes was created locally on site 401 and has not migrated. There are also three active user application processes on site 402. They are identified by PIDs, 101, 102 and 103. Each of these three processes was created locally on site 402 and has not migrated.

In a present embodiment of the invention, a process directory port group provides a designation of the sites that have at least one unallocated slot, and therefore, are available to store a reference to a port UI for a new process. More specifically a process directory port group (PDPG) 405 designates process directory fragments (PDFs) 403 and 404. In accordance with a presently preferred embodiment of the invention, the PDPG 405 includes the PM ports of sites that contain PDFs with empty slots. The presence of an empty slot in a given PDF indicates that that PDF is able to accept another PID. The PDF 403 that resides on site 401 includes empty slots 406, and the PDF 404 that resides on site 402 includes empty slots 407. Thus, both the PM port 409 for site 401 and the PM port 410 for site 402 are included in the PDPG 405.

It will be appreciated that PDPG 405 is a port "group." As such, there may be a Unique Identifier (UI) which names the group. The group itself consists of zero or more respective ports, each of which is identified by its own respective UI. In the current embodiment, ports and port groups are managed by the microkernel in a distributed fashion across all nodes of the multicomputer. An interface is provided which allows a server, such as a PM which manages a process directory fragment, to insert a port into or remove a port from the PDPG. In the present embodiment, such a PM, for example, uses its own request port to manage insertions to and deletions from the PDPG.

Furthermore, it will be understood that the PDPG is involved in process creation and destruction, but is not involved in process migration. If process creation uses the last available slots in a given PDF to hold the PID for a newly created process, then the port for the site containing that PDF is removed from the PDPG. Conversely, if process destruction frees up one or more slots in a PDF that previously had all of its slots occupied with PIDs, then the port for the site containing that newly freed up PDF is added to the PDPG.

Figure 7B:
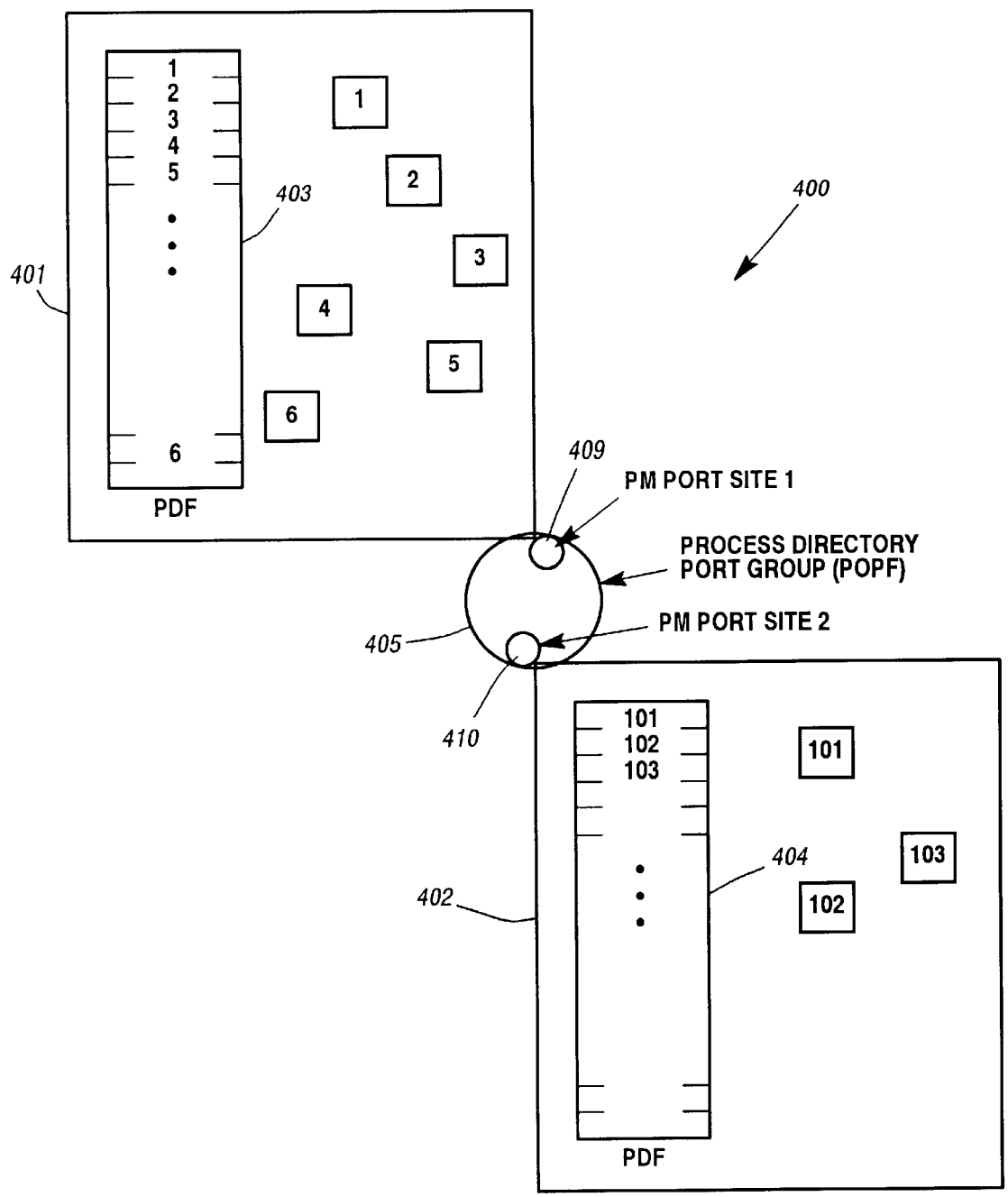
Figure 7C:
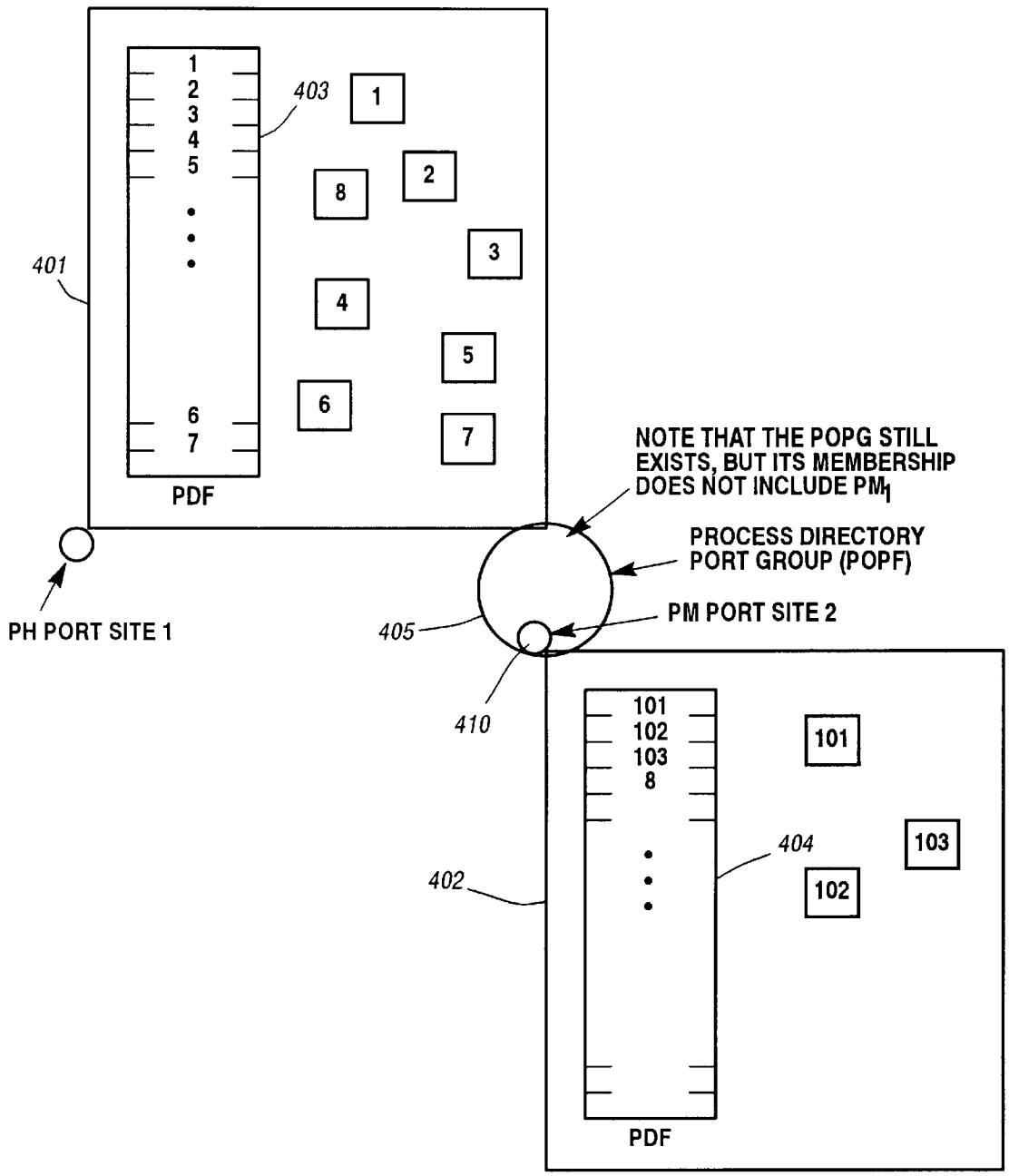

Referring now to FIG. 7B, assume, for example, that process PID 3 on site 401 issues a fork() operation to create a child process PID 6. The PM (not shown) on site 401 fields the fork() system call. In the presently preferred embodiment, the PM on site 401 sends an "allocate slot request" message to the PDPG 405 using the CHORUS microkernel associative functional mode and provides its own port (PM port 409) as a "CoTarget." The associative functional mode is a standard CHORUS facility group in which a message designates one port in a port group as the CoTarget for the message. That is, the message is sent to one member of the PDPG. If a member port of the PDPG is collocated with the CoTarget port (i.e., they are on the same site), then that member port will be used as the destination for the message. If there is no member port in the PDPG which is collocated with the CoTarget, then another member of the PDPG will be chosen by the microkernel as the destination of the message.

In this example, the PM on site 401 receives its own "allocate slot request" message. PID number "6" is assigned to the new (child) process. The site 401 PM assigns a slot to the new process PID 6 and returns a successful reply. The PM on site 401 receives the reply; stores the slot index and the site 401 PM port's unique identifier (UI) in the process data structure for the new child process PID 6 on site 401. The fork() operation completes normally with child process PID 6 having been created on site 401.

The creation of another new child process identified by PID 8 shall be explained with reference to FIGS. 7B and 7C. The creation of process PID 8 is complicated by the fact that the PDF 403 on site 401 has no vacant slots at the time of the creation of this new process PID 8. In particular, the PDF 403 is filled with PIDs 1, 2, 3, 4, 5, 6 and 7. Assume that process PID 3 on site 401 issues a fork() operation to create a child process PID 8. The PM (not shown) on site 401 fields the fork() system call. The PM on site 401 sends an "allocate slot request" message to one of the member ports of the PDPG 405 using Chorus associative functional mode and providing its own port (PM port 409) as the CoTarget. Since, in FIG. 7C, all of the slots on site 401 are filled, the PM port 409 is not a part of the PDPG 405. The microkernel, therefore, chooses another one of the member ports of the PDPG 405 in accordance with criteria that will be understood by those skilled in the art and that form no part of the present invention. In this example, since the PM port 410 for the PM on site 402 is present in the PDPG 405, and since the port 410 of the PM on site 402 is the only PM port in PDPG 405, the PM (not shown) on site 402 receives the request. The site 402 PM assigns a slot; stores the new child process PID 8; and returns a successful reply. The PM on site 401 receives the reply; stores the slot index and the site 402 PM port's Unique Identifier (UI) in the process data structure for the new child process PID 8 on site 402. The fork() operation completes normally with the child process PID 8 having been created on site 402.

In the presently preferred embodiment of the invention, the PID for a process created on a given site remains in the PDF of that creation site even if the process subsequently migrates to another site. Moreover, each site also maintains, in memory, a "bookkeeping" process data structure for each process currently active on the site. Each such active process data structure includes information regarding the session membership and the process group membership of such process as well as the PM UI for the site that contains the process' PID and the actual PDF slot number that contains the process' PID. When a process data structure corresponds to a process that is a session leader or a process group leader, then such data structure indicates whether or not the entire membership of the session or process group is resident on the site with the corresponding process. In the current implementation, the active process data structures are maintained in a doubled linked list structure.

The active process list is used, for example, at process creation time when the bookkeeping data structure for the process is added to the site, at migration time when the bookkeeping data structure for the migrating process is copied to the new site, and at process destruction when the bookkeeping data structure is removed from the site on which it resides.

The active process list also is used at failure recovery time when there is a need to determine which processes that were active on a site had their PIDs stored in a PDF on a failed site; so the failed site's PDF can be (at least partially) recreated elsewhere.

Figure 8:
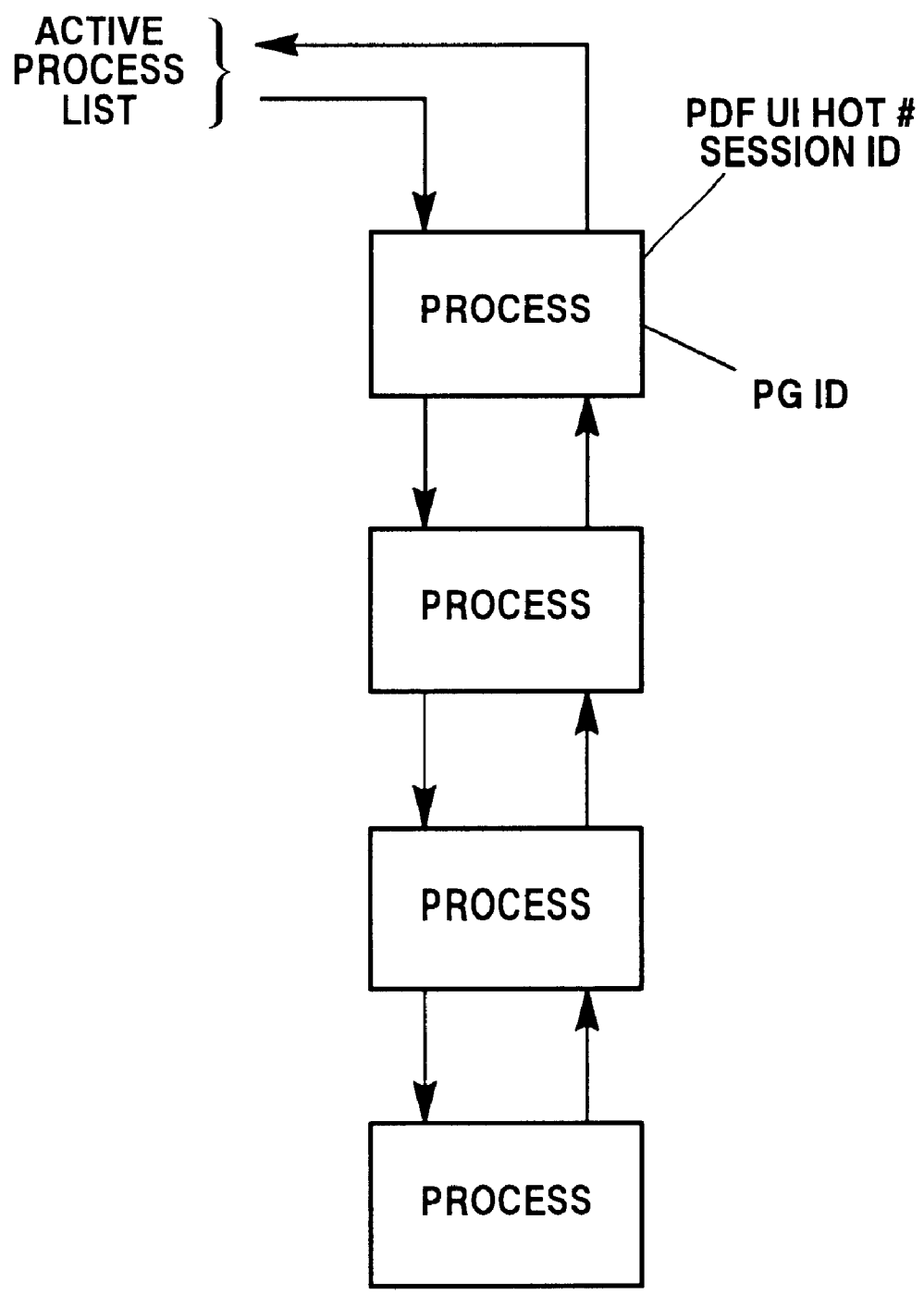
FIG. 8 is an illustrative diagram of a double linked list of bookkeeping data structures maintained on a site in which each respective data structure corresponds to a respective process active on the site that maintains the list in accordance with a presently preferred embodiment of the invention.
Figure 9A:
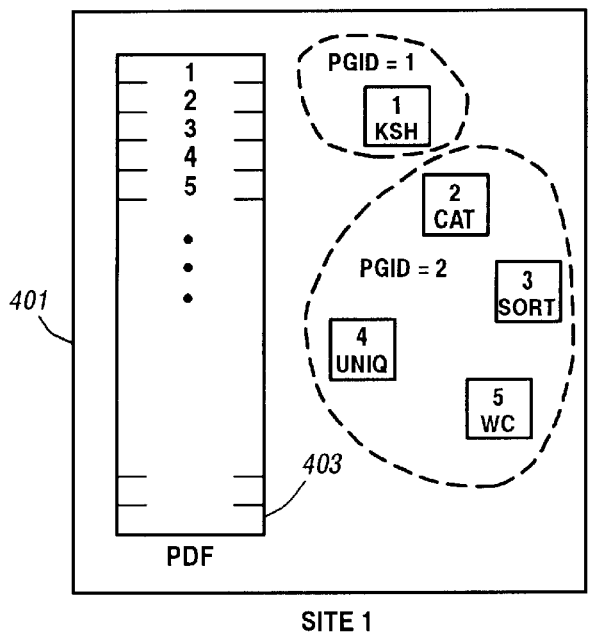
FIGS. 9A–9B are generalized block diagrams of two representative sites in a multicomputer system and the exemplary process directory fragments and processes operative on those sites used to illustrate global atomic operations in accordance with a presently preferred embodiment of the invention.
Figure 9A:
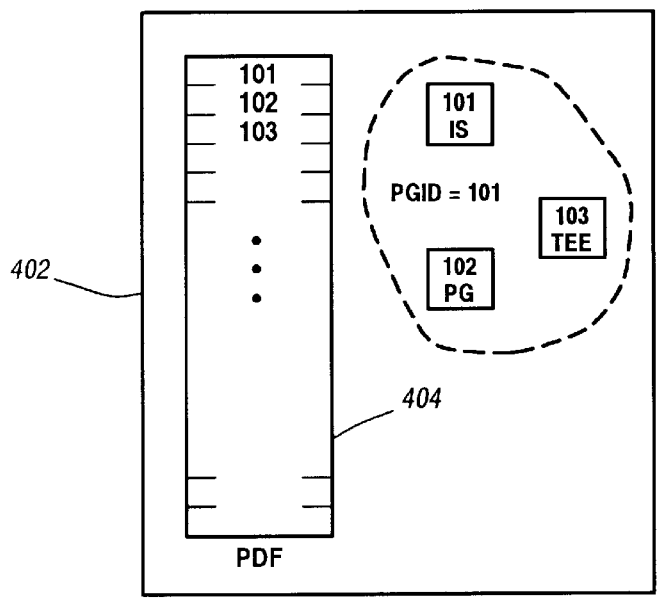

As an example, in FIG. 9A, site 2, each of the three respective processes 101, 102 and 103 are each associated with respective bookkeeping information. FIG. 8 illustrates the bookkeeping data structures for the three processes linked in a conventional double-linked list data structure headed by the label "ActiveProcessList".

The boxes in FIG. 8 represent the bookkeeping information for each process (e.g. process id, name, memory information, PDF site and slot number, etc.); the arrows show the direction of the forward and backward links.

The PM variable ActiveProcessList contains a pointer to the process structure for process 101; process 101 contains a forward pointer to process 102 and a backward pointer to the list head (ActiveProcessList). Likewise, process 102 has a forward link to process 103 and a backward link to process 101, and so forth for process 103. Process 103 will have a NULL forward link indicating that it is the last process in the list.

A pointer in this case would be the memory address of the bookkeeping data structure (known as the tProc structure), which also contains the forward and backward link pointers.

Thus, the illustrative drawing of FIG. 8 provides a generalized representation of a double linked list structure maintained on a given site which comprises a plurality of process data structures that correspond to the processes currently active on the given site. Each respective site maintains its own double linked list structure for the processes currently active on such respective site. As processes migrate to and from a given site, corresponding active process data structures corresponding to such migrating processes are added to or depart from the double linked list structure maintained by that given site. However, except in the case of site failure, as explained below, the PID for any given process is always associated with the same slot on the site that created the given process. In this sense, the slot and PDF assignment for a given process PID is immutable.

Therefore, when a process migrates from one site to another site, the PID of the migrating process remains assigned to the PDF slot originally assigned to such migrating process. However, a process data structure associated with the migrating process departs the site when the process migrates away from (the origin site) and is set up on the site on which the process migrates to (the destination site). This process data structure identifies the slot in the PDF on which the migrating process originated and which still maintains the PID of such migrating process. As a result, as explained in a subsequent section below, multiple global atomic operations can progress in parallel in spite of process migrations during the performance of such global atomic operations without missing migrating processes and without operating twice on a migrating process. Therefore, overall system performance is less severely impacted by the performance of global atomic operations involving processes running on different sites in the multicomputer system.

Moreover, the use of PIDs rather than memory addresses in the PDF slots advantageously facilitates accessing a process through its PID which corresponds to the microkernel unique identifier (UI) for the port associated with the process. As a result, the PDF slot need not be updated as a process identified by a particular PID in the slot migrates from site to site. Rather, a microkernel facility automatically keeps track of the actual location of a process when it migrates between sites within the multicomputer system.

It will be appreciated that during process creation, slots (a resource) are accessed through a dynamic set of resource managers (the PMs), which in turn are accessed through a process group managed by the microkernel (the PDPG). This facilitates the use of PDFs to create a single-system image (SSI) which provides a seamless single process namespace (a global process directory).

PROCESS MIGRATION

Figure 7D:
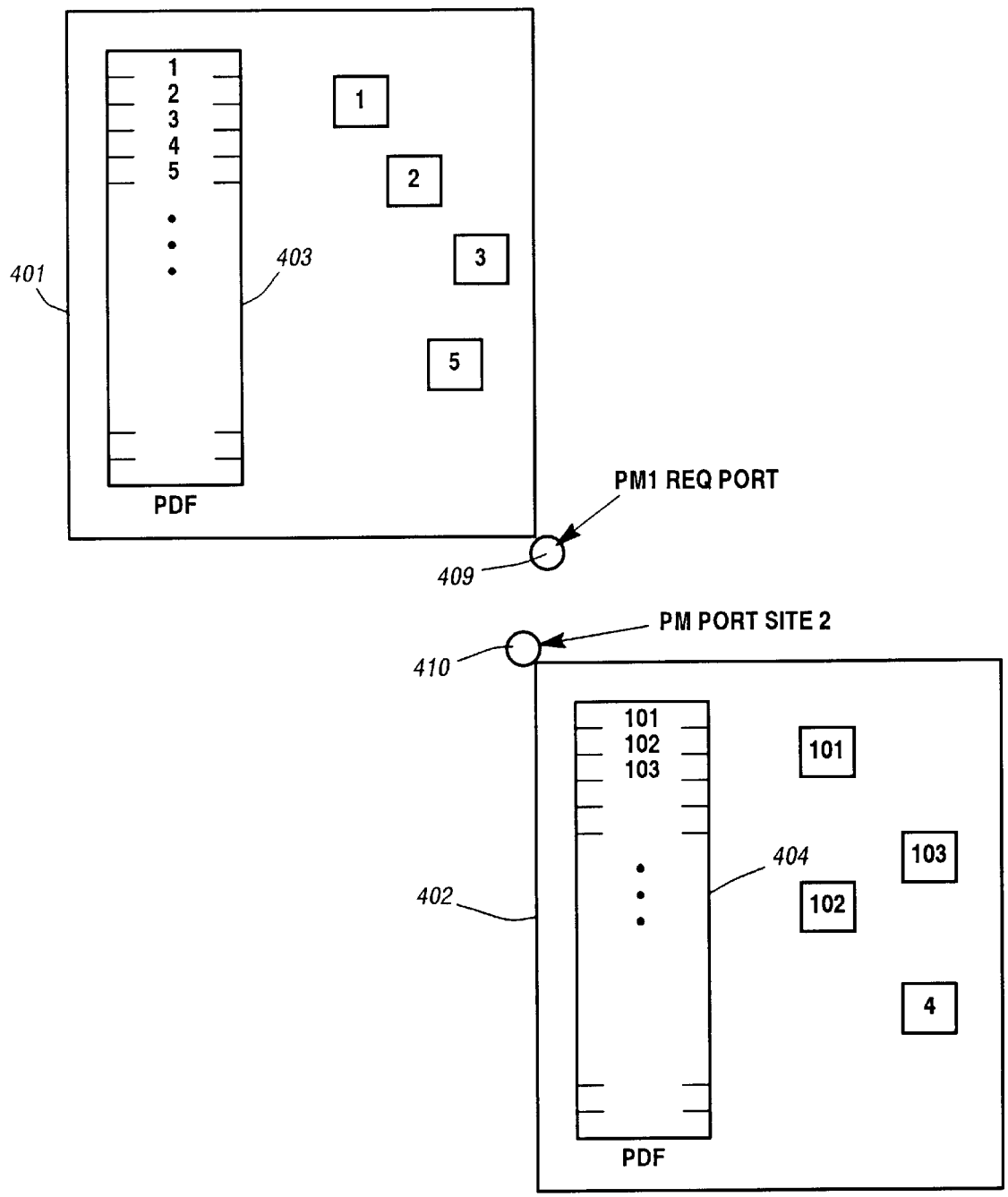

Process migration from site to site within a multicomputer system in accordance with a current embodiment of the invention shall be explained with reference to the illustrative drawings of FIGS. 7A and 7D. In particular, for example, assume that process PID 4 migrates from site 401 to site 402. A migration request is received by the PM on site 401 to migrate the process PID 4 to site 402. The migration request might be issued by a system administrator, a load balancer process or a user application, for example. The process PID 4 receives the request and marshals the migrating process' state into a message and sends it to the site 402 PM request port 410. The state information includes all information used to operate the process. This information might include, for example, memory contents, registers, multiple thread descriptions, and the (bookkeeping) process data structures. The PM on site 402 also creates the appropriate global services entities (e.g., thread, actor, address space) to create process PID 4 on site 402. The PM on site 402 constructs the process data structures and inserts them into a linked list structure like that shown in FIG. 8. Furthermore, the PM on site 402 requests that the microkernel migrate the process port UI for process PID 4 to site 402. The migration of the port UI of the migrating process ensures that the process can be tracked despite the separation of the process in site 402 from its PID stored in the PDF 403 on site 401. The PM on site 402 sends a message to the site 401 PM indicating success or failure of the migration request. If the migration has been successful, then the PM on site 401 destroys the old copy of the migrated process. The PM on site 402 starts the new copy of the process PID 4.

When the source site is cleaning up after a successful migration, it will mark the session structure for the session leader to indicate that the session is no longer local. It does this by sending a message to the session leader.

It will be appreciated that the PDF entry of the migrated process does not migrate with the process itself; the PID for the migrated process resides in the same PDF slot before and after the migration. Thus, a global atomic operation iterating through the slots of the various PDFs will not miss a migrating process or operate on it twice since the process PID slot assignment is immutable. The (bookkeeping) process data structure created on the destination site includes the PM UI for the site that contains the process' PID and the actual PDF slot number that contains the process' PID. Thus, the process data structure can be employed to ascertain the location of the PDF containing the PID for the migrated process, for example. The microkernel can keep track of the actual location of the migrated process in the multicomputer system since it tracks the location of the port UI of the migrated process. This is a standard microkernel function in the presently preferred embodiment of the invention. Thus, during the execution of a GAO, for example, the microkernel directs messages to the migrated process based on the process' PID entry in the PDF.

GLOBAL ATOMIC OPERATIONS

Figure 9B:
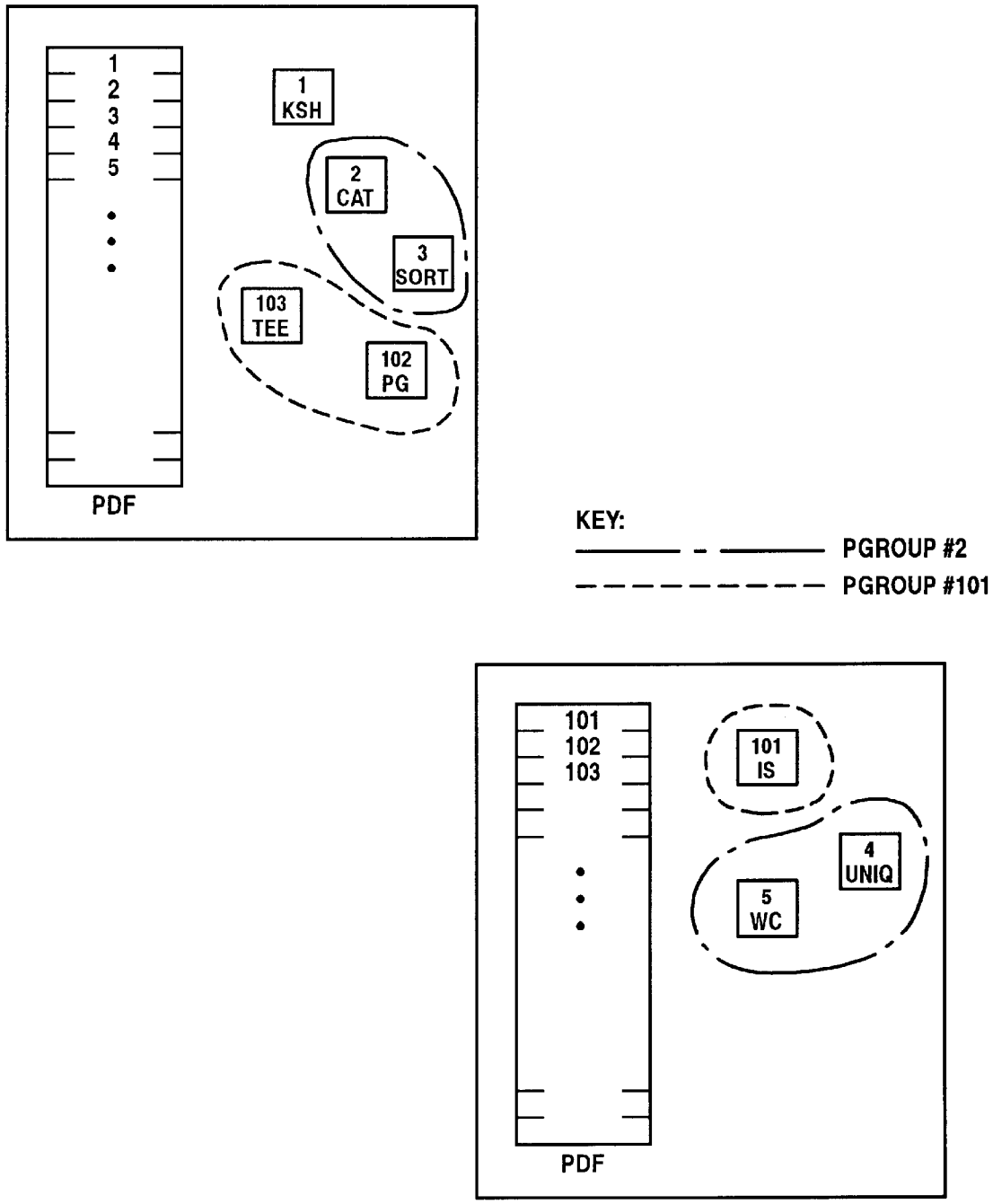

The performance of global atomic operations (GAO) according to a present implementation of the invention shall be explained with reference to the illustrative drawings of FIGS. 9A and 9B and FIG. 10. An advantage of the process employed to implement global atomic operations in accordance with the present invention is the ability to perform multiple simultaneous GAOs with simultaneous migration events without loss of a "consistent snapshot." Moreover, there is little if any throughput degradation due to serialization of global events. The multicomputer system 400 of FIGS. 9A and 9B is the same as those discussed above with reference to FIG. 7A. However, FIGS. 9A and 9B illustrate exemplary relationships among the user application processes operative on sites 401 and 402.

FIG. 10 further illustrates the relationships among the various exemplary processes running on sites 401 and 402. Specifically, session number 1 includes process groups identified by process group identities (PGIDs) 1, 2 and 3. Process group PGID 1 includes the process with PID 1. Process group PGID 2 includes processes with PIDs 2, 3, 4 and 5. Process group PGID 101 includes the processes with PIDs 101, 102 and 103.

The process PID 1 is a command processor (Ash) which serves as the session leader. The session includes two pipelines, each of which becomes a process group within the session. Exemplary UNIX instructions used to produce the session are set forth below for each of the three process groups.

```
/*PGID 1:*/
    $ ksh /* (PID 1)*/
/*PGID 2:*/
    $ cat/etc/terminfo | sort | uniq | wc - 1 & /*(PIDs 2, 3, 4 and 5) */
/*PGID 101:*/
    $ ls - lRr | tee | pg & /*(PIDs 101, 102 and 103)*/
```

Process group PGID 1 consists of a single process group, whose leader is the ksh command. Process group PGID 1 also serves as the session leader.

ksh is the Korn shell command which is a standard UNIX system command interpreter.

Process group PGID 2 consists of a single process group, whose leader is the cat command.

cat is the catenate command. It will read the contents of file "etc/terminfo" and write the contents to the standard output (which in this example is a pipe as indicated by the vertical bar "|" symbol).

sort is the sort command. It will read the data from the pipe, sort it, and then write the sorted data to its output (another pipe).

uniq is the unique command. It will read data from the input pipe, remove any duplicate adjacent lines (which sort would have sorted into adjacent lines) and write the remaining lines to its output (yet another pipe).

wc is the count command. The -l option requests that wc produce a count of lines read from its input pipe. This count will be written to its output, which will be the controlling terminal.

& instructs the ksh to put the process group in the background.

Process group PGID 3 consists of a single process group, whose leader is the ls command.

ls is the list files command. -lR signifies long format, recursive.

tee is a command to make two copies of an input, one to a file, the other to output.

pg is an output pager command which displays input to output one page at a time.

Assume, for example, that an administrator issues the following command on site 401:

$ kill-TERM-2 /* Process Group 2 in session 1*

$ kill is a nonstandard UNIX command. $ kill-TERM-2 will send the TERM signal to all members of process group 2. Although currently there is no command to send a signal to all members of a session, there is a programmatic API for it.

The site 401 PM receives the $ kill signal request via its system call interface. This receiving PM determines that the target is the group of processes in process group 2 in session 1, and if appropriate as explained below, multicasts a message to all PMs instructing them to deliver SIGTERM (a software termination signal) to all members of process group 2. Each PM, upon receiving the SIGTERM request, will iterate through its PDF slots. For each PID, it sends a SIGTERM request to the corresponding process instructing it to deliver SIGTERM if the process is a member of process group 2 in session 1.

It will be understood that each PID serves as the UI for an associated process. Such associated process may reside on the same site as the PDF that stores the PID for such process or may reside on a different site. In either case, a microkernel location mechanism "knows" where such associated process currently resides.

Thus, the microkernel ensures that the request is delivered to the appropriate processes based upon their process PIDs. Each such process, in turn, checks its bookkeeping process data structure to determine whether or not it is a member of process group 2 in session 1. If it is a member of the targeted process group, it will perform the action that the process has associated with the SIGTERM signal. The default action is to terminate the process (although a process can override this if it desires). If it is not a member of the target process group, it will do nothing. The site 401 PM, the original PM caller, collects responses from the processes that received the SIGTERM request and prepares a return to the caller of the SIGTERM call.

It will be appreciated that in the current embodiment the process group id is the same as the PID of the process PID group leader. Likewise, a session id for a session will be the PID of the session leader.

In the presently preferred embodiment of the invention, a global atomic operation against a session or a process group that is entirely local does not require a multicast. When a process group or session is targeted, the signal request will be sent (inter alia) to the group leader (process or session) which will check its (bookkeeping) process data structure. If that structure indicates that all members are local, the local PM will handle the signal locally without resort to a multicast message. Otherwise, as in the situation described above, a multicast message is sent.

For example, a GAO against session 1 would require a multicast, since session 1 consists of multiple process groups on different sites. However, a GAO against either of the process groups would not require a multicast since each of the process groups is local to a single site.

More specifically, for example, the (bookkeeping) process data structure for the session leader ksh will contain an indication as to whether or not the entire membership of the session and the process group PGID 1 for which ksh is the leader is contained on site 401. In the situation illustrated in FIG. 9A, the indication would note that the process group (which consists solely of ksh itself) is in fact local to site 401. Additionally, since the process group PGID 101 is on site 402, there would be an indication that the session is not local to site 401. Consequently, a globally atomic operation directed to session 1 requires multicast, but a globally atomic operation directed only to process group PGID 1 would not require multicast. Similarly, respective process data structures for process groups PGIDs 2 and 101, as shown in FIG. 9A, would respectively indicate that all of the member processes of process group PGID 2 are local to site 401, and that all of the process members of process group PGID 101 are local to site 402. Consequently, globally atomic operations directed against either of process groups PGIDs 2 or 101 would not require multicast. In that case, the signal is sent to the local PM which handles it, as described above, as if it were multicast to that single site. An advantage of this approach is that this all occurs on a single site, and no additional resources (message bandwidth, processor utilization, memory space) on other sites will be used.

FIG. 9B shows the same session and process groups of FIG. 9A after various members have migrated. Specifically, the user application processes corresponding to PIDs 4 and 5 have migrated to site 402, and the user application processes identified by PIDs 102 and 103 have migrated to site 401. Global atomic operations to members of either process group PGID 2 or process group PGID 101 require multicast operations because the members of process groups PGIDs 2 and 101 are divided among sites 401 and 402. Global atomic operations to process group PGID 1, however, can be handled locally by the site 401 PM since the sole process in PGID 1 is on site 401.

A PM that receives the global atomic SIGTERM operation described in the above example uses PIDs to identify processes to be operated upon without the SIGTERM request knowing the site on which the corresponding process actually runs. The microkernel keeps track of the actual location of a process even when the process migrates from one site to another, and, therefore, there is no need for the PID of a migrating process to migrate with the process itself. Since PIDs remain in the same slots regardless of process migration, there is less risk that a global atomic operation will miss migrating target processes or will operate twice on migrating target processes. Thus, it is not necessary to serialize globally atomic operations in view of the possibility of process migration. These global operations may occur in parallel which ensures a limited impact on overall system performance even if many such operations occur simultaneously.

RECOVERY AFTER SITE FAILURE

Figure 11A:
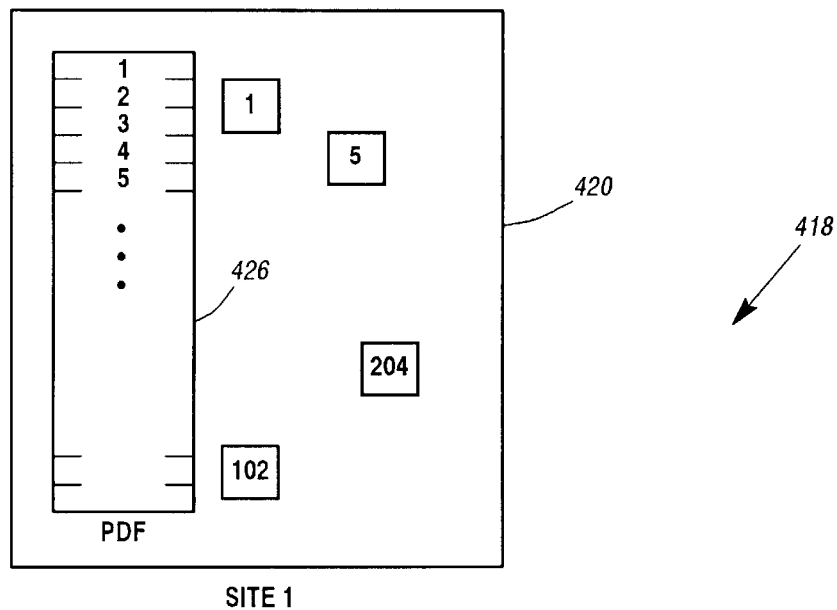
FIGS. 11A–11B are generalized block diagrams of two representative sites in a multicomputer system and the exemplary process directory fragments and processes operative on those sites used to illustrate site failure recovery in accordance with a presently preferred embodiment of the invention.
Figure 11A:
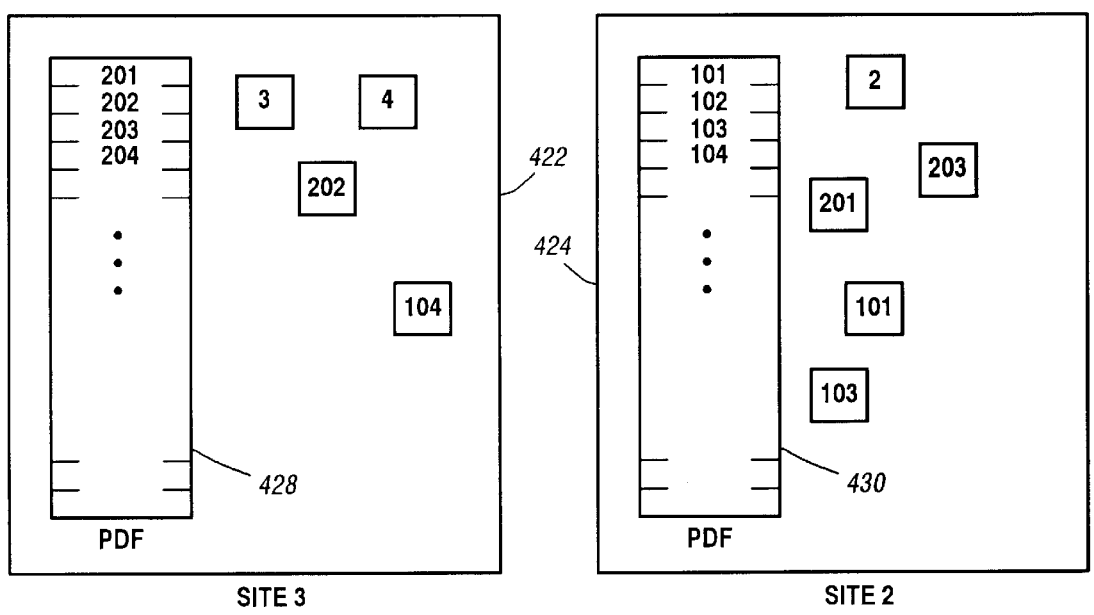

Referring to the illustrative generalized drawings of FIG. 11A, there are shown three sites of an exemplary multicomputer system 418 in accordance with a presently preferred embodiment of the invention. Site 420 includes PDF 426 which stores PIDs 1, 2, 3, 4 and 5. The user processes that correspond to PIDs 1, 5, 102 and 204 run on site 420. Site 422 includes a PDF 428 which stores PIDs 201, 202, 203 and 204. The user application processes that correspond to PIDs 3, 4, 104 and 202 run on site 422. Site 424 includes PDF 430 which stores PIDs 101, 102, 103 and 104. The user application processes that correspond to PIDs 2, 101, 103, 201 and 203 run on site 424.

The current embodiment of the invention provides processes and associated structures in electronic memory to facilitate recovery of processes in the event that a site in the multicomputer system 418 fails. Assume, for example, that site 422 experiences a failure and is no longer operative. The failure of site 422 will be detected by a computer program referred to as a siteview manager, which runs on hardware external to the system. All components may register interest in site failure notification. The PM, FM and STM may all register with the siteview manager (via the microkernel) such that they will be notified upon site failure.

In accordance with a current embodiment of the invention, following the failure the PMs on each of the surviving sites, site 420 and site 424 check the respective (bookkeeping) process data structures for each process running on such surviving sites to identify those surviving processes that correspond to a PID that was managed by a slot in the PDF 428 of failed site 422. A list of these identified processes is sent to a PM on a site chosen to manage the PDF for the failed site 422. In this example, site 424 has been chosen (at random) to host the reconstruction of the fragment of the process directory lost when site 422 failed. Referring to the illustrative drawing of FIG. 11B, there is shown the multicomputer system 418 with only surviving sites, site 420 and site 424. The chosen PM will attempt to reconstruct the PDF 428 of the failed site 422 and will manage it as if it was part of the failed site 422. It will be appreciated that from the perspective of getdents, or other GAO, it appears as if the PDF for the failed site is still present, and the processes that were managed by that PDF and were not executing on the failed site, are still active and part of the consistent snapshot. However, since the processes that had been running on site 422 have been lost, only deallocation requests are processed for the reconstructed PDF 428'.

Moreover, in accordance with the failure recovery process, the respective PMs on the surviving sites, site 420 and site 424 attempt to contact each process identified by a PID in the respective PDFs, PDF 426, PDF 430 and reconstructed PDF 428', that they manage. For instance, each respective PM may send a ping message to each process identified by a PID in its respective PDF. Any process that fails to respond is assumed to have been active on the failed site; since generally, there is no other reason a process would fail to respond (absent an operating system bug or hardware failure—both of which may result in site failure).

Figure 11B:
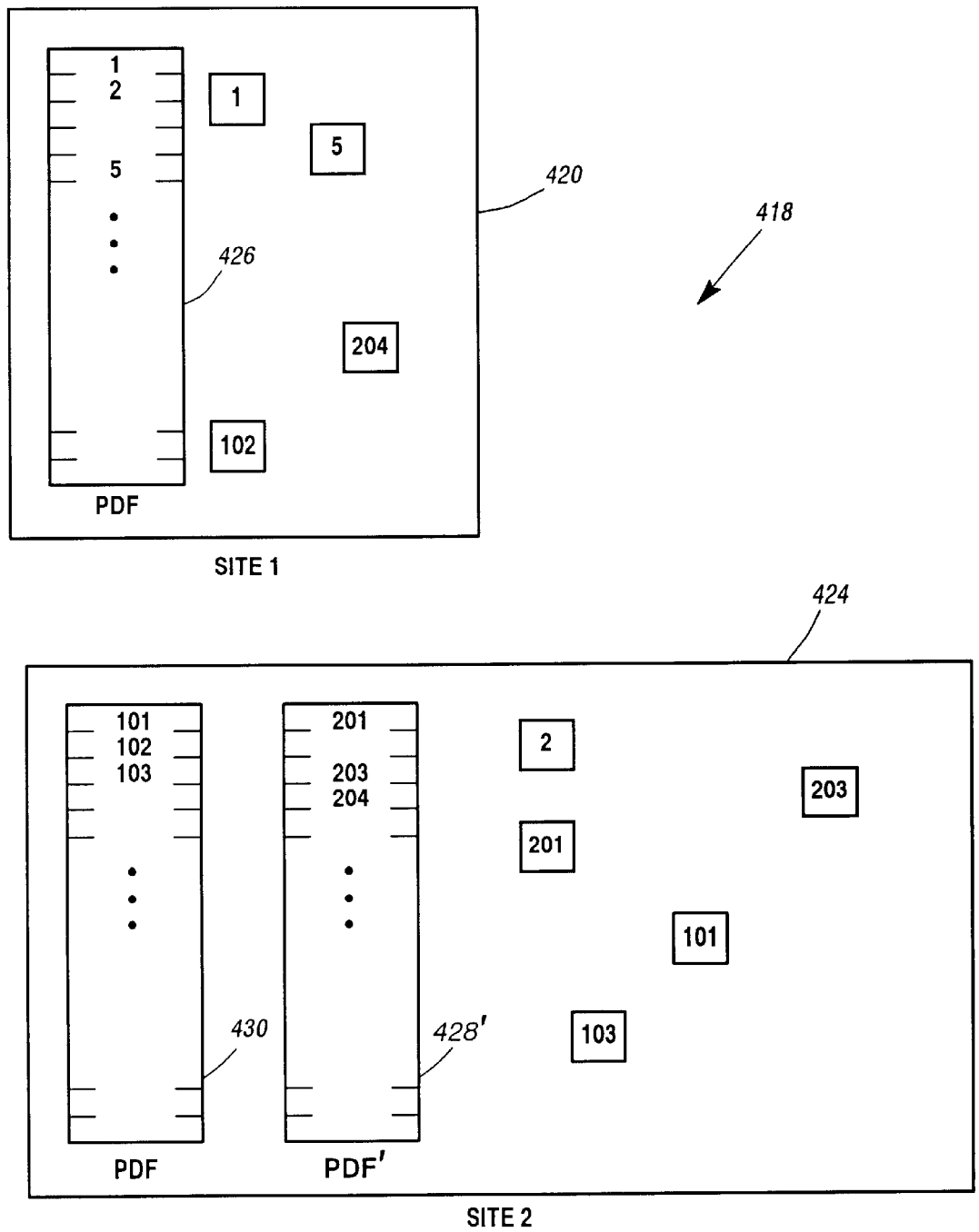

The PIDs of processes that were active on a failed site are removed from the respective PDFs that stored them. Referring to FIG. 11B, the PM on site 420 cannot contact processes corresponding to PID 3 and PID 4 since they had been running on the failed site 422. So, the PIDs for these processes are removed from PDF 426. Similarly, the PM on site 424 cannot contact the processes identified by PID 104, and the PID for this process is removed from PDF 430. Likewise, the PM on site 424 cannot contact the process identified by PID 202, and the PID for that process is removed from the reconstructed PDF 428'.

MICRO-KERNEL PROCESS LOCATION SERVICE

In a presently preferred embodiment of the invention, the micro-kernel includes process location services which are computer programs and related data structures used to locate migratable processes. The following sections describe these services.

PORT NAME SERVER

This section describes a port name server which is used to localize (i.e., determine the location of) a migrated port. As explained above, the basic interprocess communication mechanism in the present embodiment involves messages. Messages are sent between ports during interprocess communication. A message sender must know the name of the destination port to send a message. This name is a unique name in space and time. When an actor sends a message to a port, the micro-kernel needs to know on which node (site) is located the destination port. Since most ports do not migrate, an optimization has been implemented, storing the creation site of the port within the port UI itself.

In the present embodiment, a port UI is an "opaque" data structure—meaning that the contents of the data structure are only relevant to the micro-kernel, not the clients of the micro-kernel. The micro-kernel stores as part of the UI the site number on which the port was created, e.g., UI:

| site number | UI head | UI tail |

UI head and UI tail are opaque fields used by the micro-kernel to ensure that all UIs created will be unique.

If ports did not migrate, then using a port name to find a port location would be enough. But ports do migrate. When a port migrates, the site number embedded within the port UI loses much of its usefulness. The port is no longer on its creation site and the micro-kernel cannot use the creation site to localize the port. However, of course, ports can migrate. When processes migrate, the port which is used to address the process must also migrate with the process.

As explained above in earlier sections, a UI can be used to describe either a single port or a port group. Localization of a port group is a somewhat different proposition than localization of a port, however, since a port group really does not have a location, per se, being a collection of ports which can be located almost anywhere in the system. A port group UI can be considered to be a "meta" port which is decomposed into an appropriate single port UI or multiple port UIs, depending on the mode or the nature of a request. For instance, a broadcast request may result in selection of all ports in a port group.

PORT LOCALIZATION SERVER AND PORT STATUS INVESTIGATOR

This section describes the architecture of the port localization server (PLS) and its interface with the different components of the single-system image (SSI). The PLS is responsible for maintaining port localization information. In a present embodiment, the PLS includes a naming service which maintains a port localization cache which is a set of tuples (site, UI) for all ports with which it has successfully communicated. The cache is of finite size, and entries will be reused on an LRU (least recently used) basis. Since, in the current embodiment, the PLS is a centralized service, only one instance of this server runs in the SSI. Specifically, PLS runs on the essential services site {em essential node}, a designated site where centralized services are located and which is supposed to be alive at all times.

Figure 12:
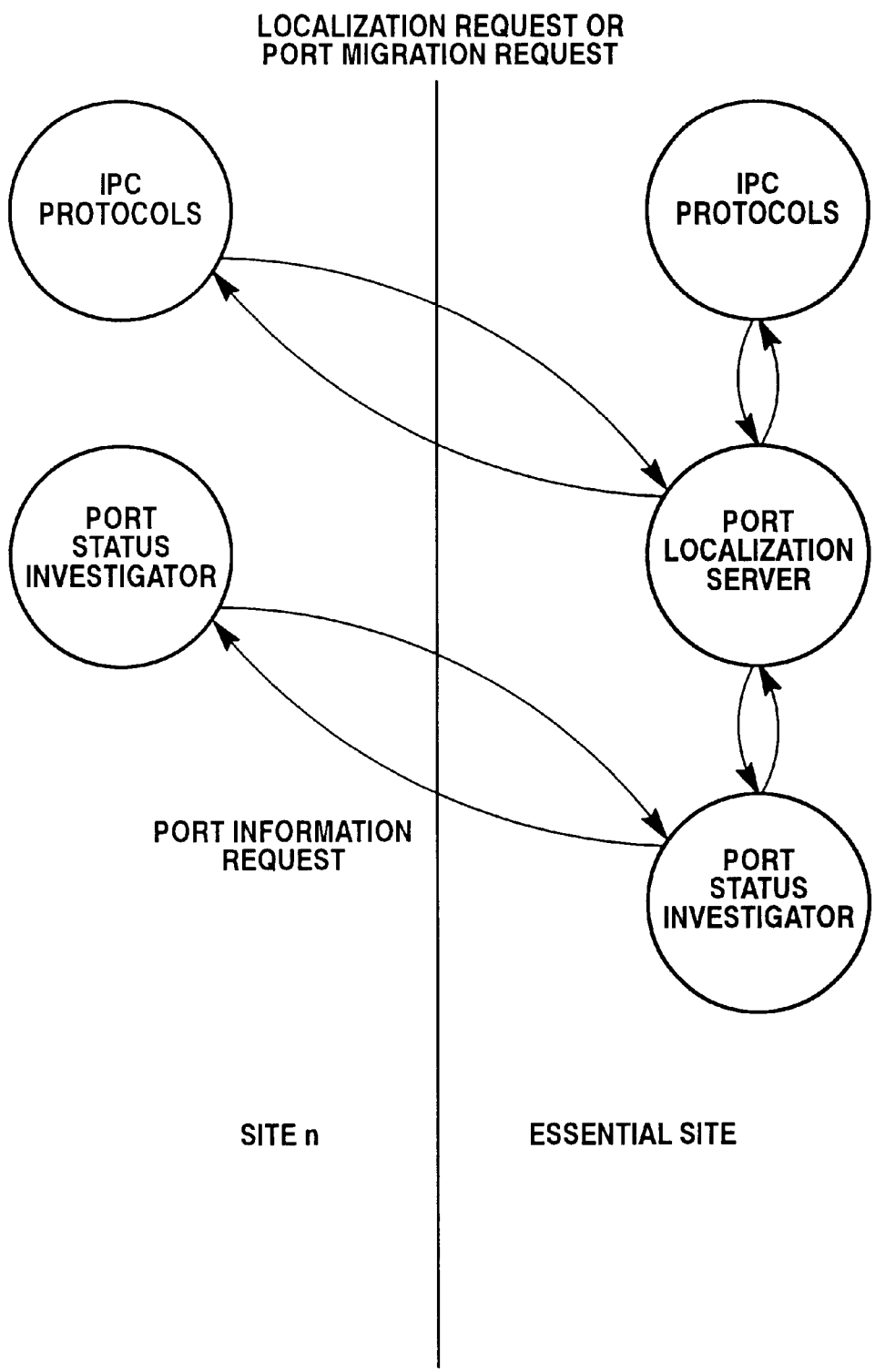
FIG. 12 is an illustrative generalized drawing of the Software interfaces to the port localization server (PLS) and the port status investigator (PSI) in accordance with a presently preferred embodiment of the invention.

The PLS provides two interfaces. One for the interprocess communication (IPC) services and one for a the Port Status Investigator (PSI) service. FIG. 12 provides an illustrative drawing of the general interfaces to the PLS. The PLS and PSI are disposed on the essential services site. The PLS communicates with the PSI. The PLS also communicates via IPC protocols with other processes disposed on the essential site and with processes disposed on other sites, such as site n shown in FIG. 12. The PSI on the essential site also communicates with PSIs on other sites, such as site n. The IPC interface is used by the IPC protocol to add, remove, or localize a port into the PLS port UI database. This interface also is used by the IPC to migrate a port. IPC requests typically use the localization cache or PLS services, since generally it is not known a priori whether or not a port has migrated from its creation site.

During migration of a port, the PLS must provide consistent information about migrated ports and about ports that are in the process of being migrated. The PLS, therefore, has access to the current state of all the ports that are in the process of being migrated. A port migration coordinator uses the PLS to register the migrated port once it is migrated.

The PLS also implements an interface with the Port Status Investigator (PSI). When a site failure is detected, the PSI needs to get the list of the ports which have been migrated to the failed site, and the list of the ports which have been created on the failed site and migrated out. The PLS provides those two lists through its interface with the PSI.

PORT LOCALIZATION PROCESS

The PLS is used by the IPC to localize ports which have been migrated. The objective is to store into the PLS's port localization cache all the migrated ports' UIs and the site numbers where they are located.

The IPC port localization protocol is basically as follows. This IPC port localization protocol runs locally on every site. If a destination port UI of an IPC message is not in a local cache of UIs or, if it is and the port is no longer on the site listed in the local localization cache, then the PLS protocol will be run. A local protocol described as follows:

1. If the destination port is local, queue the message behind the destination port and return.

2. If the destination port is not local, check whether the UI is registered in the local cache of UIs. If the destination port is in the cache, send the message to the site where the port is supposed to be. If the port is really on this site, return. Otherwise, go to step 4. If there is no entry in the cache, go to step 3.

3. Send the message to the creation site of the destination port. This creation site is extracted from the UI. If the port is there, return. Otherwise, continue.

4. Query the PLS to see if it knows where the destination port is. If it does, send a message to the port indicated by the PLS. If the port is not where the PLS indicated it would be, then retry step 4. If the PLS does not know about the destination port, return port unknown to the sender, the code which attempted to send a message to the port.

In a present embodiment, the PLS interface is based on RPCs. The PLS handles those requests with a message handler, allowing it to serve several requests at the same time.

PORT LOCALIZATION AND MIGRATION PROCESS

Figure 13:
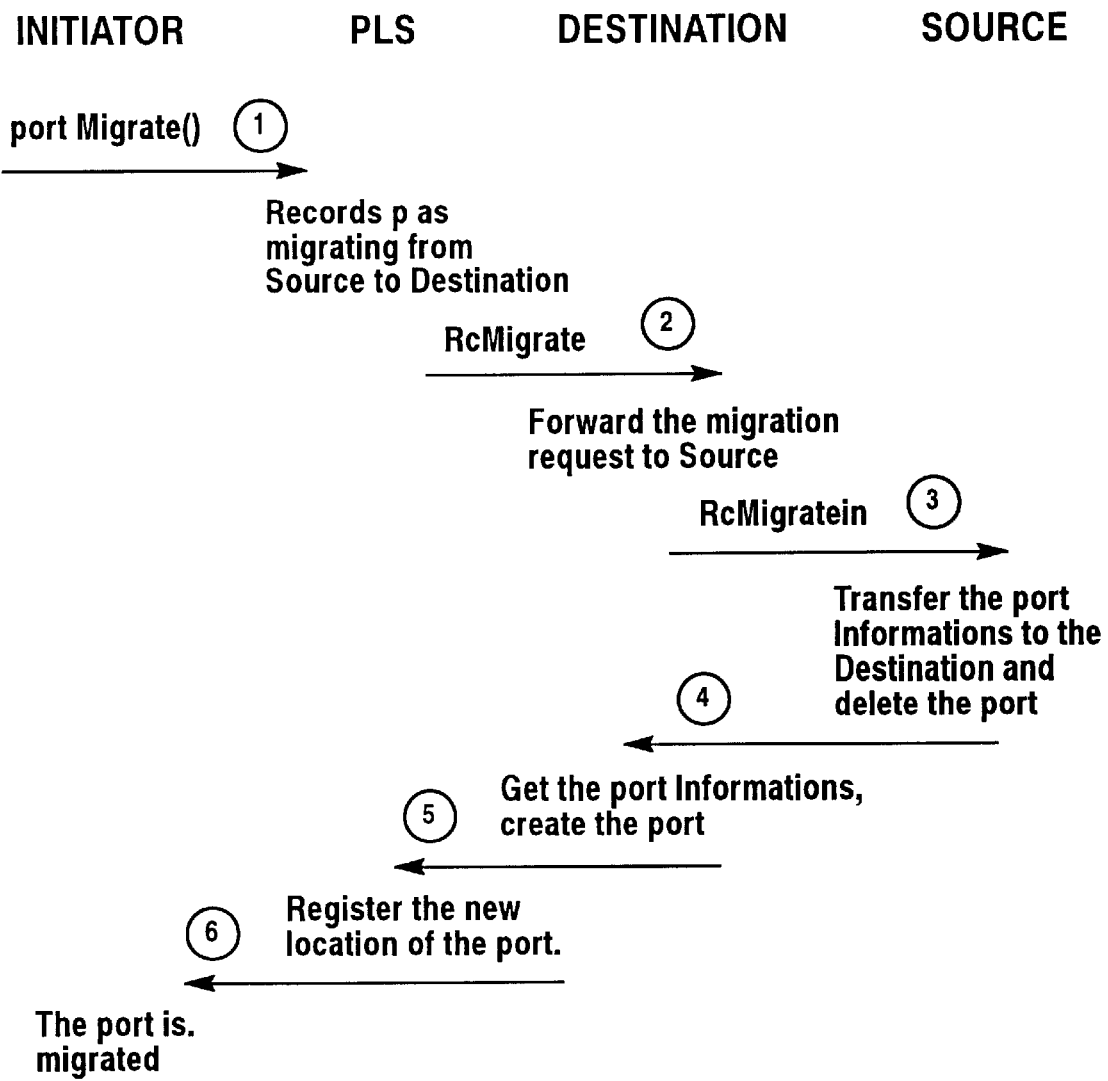
FIG. 13 is an illustrative drawing of an exemplary message protocol during port migration in a presently preferred embodiment of the invention.

The PLS is involved in the port migration process, since it acts as a port migration coordinator. The port migration coordinator is used when the source and destination site of the migration are not the same. The micro-kernel permits migration of a port between actors. It will be appreciated that there can be port migrations between source and destination actors operative on the same site or between source and destination actors on different sites. Basically, the migration coordinator keeps track of the state of the port migration at any time. If a site failure occurs, the coordinator knows if it affects the port migration. The illustrative drawing of FIG. 13 shows an exemplary messaging protocol that involves a port migration.

An actor which calls a "port Migrate" service to request that a port be migrated shall be referred to herein as an "initiator." Referring to FIG. 13, if a source actor and a destination actor of the port are not on the same site, the PLS drives the port migration, as follows.

1. The initiator sends a port migration request to the PLS.
2. Then, the PLS forwards this request to the site location of the destination actor (named, {em destination site}), which allocates the local resources needed to receive the migrating port and then
3. Then, the destination actor forwards the request to the site location of the source actor (named, {em source site}). The source site builds a reply message with all the information related to the migrating port, such as the list of the groups where the port has been inserted. The port is deleted.
4. Then, the source actor sends the reply to the destination site.
5. Then, the destination site inserts the port into all the groups the port belongs to, and replies to the PLS. It will be appreciated that a port may be a member of multiple port groups. The port is reinserted into the port groups after the migration. Once the PLS gets this reply, it indicates in the localization cache that the port is located on the destination site.
6. Finally, the PLS replies to the initiator, and the port migration is then completed.

If a port is migrated back to the site where it has been created, the PLS forgets the port as soon as the port has been migrated. That is, the PLS drops the port from the PLS localization cache (since the creation site stored in the UI is now useful again). This is an optimization, because a port which has been migrated away from its creation site, and later migrated back to this site, can be considered to be just like any other ports to which it never has been migrated.

The PLS can be implemented to handle the situation in which a localization request is received concerning a migrating port before the migration is complete. Two alternative procedures for handling this situation have been developed. First, the PLS can block the request (does not answer) until the port migration is completed. This mechanism is very simple because the source of the localization request does not have to know that a port migration is in progress, but some resources, such as the PLS message handler thread and the message structure, are held on the PLS site until the port migration completes. Since the PLS runs on the essential services site, where all the centralized services run, it may not be good practice to hold information that long. Second, the PLS can return an error message to the caller (busy message), forcing the caller to wait and try again later on. This solution is the preferred solution. Eventually, when the port migration is completed, the PLS will answer the request.

Once a port has been migrated, the port is flagged as registered in the PLS. When a registered port is deleted, the IPC makes sure that the PLS is notified of the deletion, allowing the PLS to remove the port UI from its table. A process and its corresponding port are deleted, for example, when the process exits or is killed.

SITE FAILURE AND PORT MIGRATION PROCESS

When a site fails, all the ports which have been migrated to this site still have entries in the PLS. Those entries need to be removed. The sight view manager (SVM) which runs on the essential services site (ESS) pings each site at prescribed time intervals, e.g. every ten seconds. If a site does not reply, the SVM assumes the site has failed. The SVM notifies the PLS of the site failure, and the PLS goes through its VI deletion (or cleanup) routine.

The process described above is sufficient when a site failure does not happen at the same time as a port migration from a source site to the failing site, but a special recovery mechanism is needed when the source site or the destination site of a port migration fails during the migration. The PSI uses the PLS to obtain a complete list of ports migrated into the failed site (this list is named {migTo}), the PLS must keep a coherent state of migrating ports all the time. Since the PSI has a specific interface to the PLS to get those lists, and since the PSI needs to get those lists before it actually triggers a site view change monitors, the PLS needs to take special care about site failure happening while a port is migrating.

However, knowing the exact state of the port migration at any time is difficult, since four sites typically are involved in the process and since the PLS cannot rely on the site view change monitor. The four sites (nodes) are: source, destination, PLS (Essential), and the site which is attempting to determine the location of the port (e.g., to send a message to it). When the SVM notes a site view change, it will invoke a callback in the PLS to remove from the local localization cache any ports which were localized to the failed site.

When the source or destination site fails during a port migration, however, the PLS does not know if the port has already been migrated by the time of the failure. For instance, if the target fails after the source has sent the port information and deleted the port, the migrating port does not exist any more. But, if the source fails before sending the migration request to the source, the port is still alive on the source site. Since failure notification is not synchronized among the sites, and since it is possible to receive late messages from a failed site, it is difficult to develop an algorithm where the state of the migration is known at all times, where the source site or the target site can fail. Instead, in a presently preferred embodiment of the invention, the PLS, in essence, takes a guess at the state of the migration. If the guess is incorrect, the PLS forces the state of the port migration on all the surviving sites to match its own state.

When the source or the destination fails during a port migration, depending on when the port migration happened, the port likely is either (i) dead, because it was on the failed site, or (ii) still alive, because it was on the surviving site by the time of the site failure. In a presently preferred embodiment of the invention, the PLS makes the assumption that the worst has happened. When the source or the destination site fails while a port is migrating, the port is considered by the PLS as dead. Referring to FIG. 13, the previous assumption means that from the moment that the message 1 is received by the PLS until the moment that the message 5 is received, if the source or the destination fails, then the port will be considered dead.

The PSI asks for the migTo and migFrom lists as soon as a site failure is detected on the ESS. (From now on, this operation will be referred to as {PSI query}.) The PSI query can happen before or after all the messages sent by the failed site have arrived at their destinations. No assumption is made about the ordering of those events.

Source failure presents a different situation from destination failure.

When the source site fails:

Assume the source site fails before message 2 is sent. The port is considered as dead, and the message 2 has been sent. The target will never know about the port migration. The PLS simply returns a failure to the initiator to let it know that the port migration has failed.

Assume the source site fails after the message 2 is sent and after, the message 3 is sent. If the source site fails before it had a chance to send the reply 4, the destination site will eventually get a response that the source is unknown. The destination site returns an error to the PLS, and the PLS returns an error to the initiator. The port migration is considered as failed.

Assume the source fails after sending the reply 4. The PSI query happens before the reply 6 arrives to the PLS. In that case, the port is considered as dead. However, each of two possibilities must be handled.

The first possibility is that the destination site finds out about the failure of the source site before the message 4 is delivered. In that case, a response is returned indicating that the source is unknown. This case is the same as the previous case, and an error is returned to the PLS. The port migration is considered as failed.

The second possibility is that the destinations site gets the reply 4 before it detects that the source site has failed. A new port is created and a successful migration is reported to the PLS. The PSI query has been registered on the PLS, so when the PLS gets the reply 5, it can detect the incoherence between the content of the message 5 and its own state. Since the port has already been considered as failed, the PLS sends a message to the destination site to destroy the migrated port. This cleanup is necessary because, otherwise, the failed port would be living and accessible on the destination site, which would be incorrect. The port migration is considered as failed, and an error reply 6 is sent to the initiator.

On the other hand, if the source fails after sending the reply 4, and the PSI query happens after the PLS receives the reply 5, and the port is considered as living, then the port migration is considered as successful.

When the destination site fails:

Assume that the destination site fails before it had a chance to send the reply 5. There are two possibilities that should be handled.

The first possibility is that the PSI query happened before the PLS gets a destination unknown error from the message 2. The port is considered as dead. Since the PLS has no possibility to know if the destination site has failed before or after sending the message 3, the PLS sends a clean-up message to the source site to destroy the port, if it is still there. If the message 3 has been sent and received, the port already has been deleted. Nothing has to be done.

If the message 3 has not been sent, the port is destroyed. If the message 3 has been sent, but not received yet, the PLS can detect the destination's failure and send the clean-up message to the source site before message 3 is delivered to the source. In that case, as mentioned, the port is destroyed, but, later, the message 3 arrives. Since the message 3 is a request to migrate a non-existing port (non-existing because destroyed), an error is returned. (No one is going to receive this reply.)

The PLS returns a success to the initiator. The port migration is considered as successful. The process successfully migrated from source to destination, and the destination subsequently failed. Of course, any subsequent attempt to contact the process will fail because the site is unknown.

The second possibility is that the PSI query happens after the PLS received a destination site unknown error from the message. The PLS registers the port as being on the destination site, sends the clean-up message to the source site, and returns a successful migration response to the initiator. The port migration is considered as successful, and the port is considered as alive, until the PSI query happens. The source and initiator will consider the migration to have been successful since the process did successfully migrate off the source site.

PLS INTERFACE WITH PSI

Figure 14:
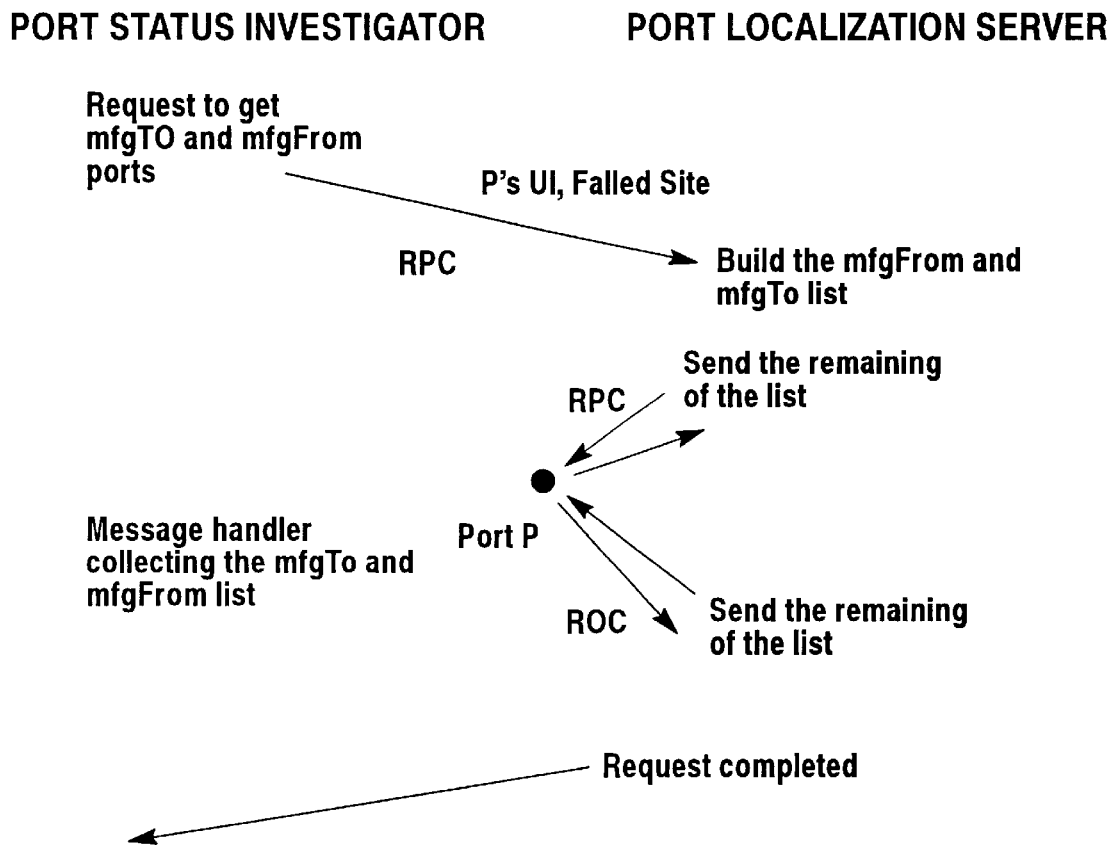
FIG. 14 is an illustrative drawing of the message protocol between the PLS and the PSI of FIG. 12.

The PSI needs to get the {migTo} and {migFrom} lists. Since it is not possible to predict the number of ports those lists can contain, the interface between the PLS and the PSI must be able to fragment those lists into smaller packets. Referring to FIG. 14, the interface, in accordance with a present embodiment, uses the IPC. The PSI sends a request to the PLS including the site number of the failed site and the UI of the port where a message handler has been attached, ready to handle the message from the PLS containing the {migFrom} and {migTo} ports.

In a present embodiment, the PSI creates a port and attaches a handler to the port to respond to messages delivered to the port. This port is created by the PSI to receive messages from the PLS containing the variable sized migFrom/migTo lists. It will be deleted when no longer necessary.

When the PLS gets any PSI requests, it first checks if the failed site is either the source or the destination of any of the port migrations in progress. If it is, the state of the port migration in progress is changed (the migrating port is marked as dead, as described in the previous section), and the migrating port is included into the {migTo} port if the failed site was the destination site. Then the PLS scans its table to find all ports created on the failed site and migrated away ({migFrom}), and all the ports migrated to the failed site ({migTo}). This list of ports is built into a message. If the list exceeds the size of a message, the list is sent using several messages.

PORT CREATED WITH PORTDECLARE

In a current embodiment, parts of the operating system (not the PM, generally) may use a process referred to as, portDeclare/uiBuild to construct a UI, bypassing the code which stores the creation site in the UI; thus, this "hint" cannot be used to determine the port destination. More specifically, a micro-kernel system call {portDeclare()}, which forms no part of the present invention, allows the user to create a port with a user-defined UI. This UI is built using {uiBuild()} which allows the user to set the creation site part of the UI to any value. That means that port can be created in such a way that the IPC cannot retrieve the real creation site number. Such ports need to be localized even if they did not migrate. They need to be registered in the PLS at the time of creation. Since performing this operation creates an overhead, and since most of the port created with {portDeclare()} has a correct creation site number embedded within the port UI, a good optimization is to register only the ports which do not have a correct creation site number. Since the PLS needs to know what was the site c creation of all the registered ports, and since the PLS cannot rely on the creation site number embedded within the UI, the creation site number needs to be explicitly stored with the port UI and the present location site.

While a particular embodiment of the invention has been described in detail, various modifications to the preferred embodiment can be made without departing from the spirit and scope of the invention. For example, although the current embodiment employs a CHORUS microkernel and UNIX SSUs, the invention can be implemented with other operating system components as well. Thus, the invention is limited only by the appended claims.

What is claimed is:

1. A method for responding to a computer system call requesting creation of such new process in a multicomputer system which includes multiple sites, each site including a local processor and local memory, and wherein the multicomputer system includes a distributed process directory which is distributed across multiple sites such that different site memories include different fragments of the process directory and such that the distributed process directory includes a multiplicity of slots, the method comprising the steps of:

creating the new process on a respective site;
providing in memory of at least one site a designation of sites for which respective process directory fragments include at least one unallocated slot;
selecting a respective site from the designation; and
referencing a respective process identification corresponding to the new process in a slot in a respective process directory fragment on the selected site.

2. The method of claim 1 further including:
providing different respective process manager servers operative on different respective sites;
wherein a respective process manager server operative on a first site creates the new process on the first site in response to the system call; and
wherein the step of providing in memory of at least one site a designation of sites involves providing a designation of process manager servers operative on respective sites for which respective process directory fragments include at least one unallocated slot.

3. The method of claim 1 further including:
providing different respective process manager server operative on different respective sites;
wherein a respective process manager server operative on a first site creates the new process on the first site in response to the system call;
wherein the step of providing in memory of at least one site a designation of sites involves providing a designation of process manager servers operative on respective sites for which respective process directory fragments include at least one unallocated slot; and
wherein the step of providing a respective process identification involves a respective second process manager server operative on the selected site associating the respective process identification corresponding to the new process with a slot in a respective process directory fragment on the selected site.

4. The method of claim 1 further including:
providing different respective process manager servers operative on different respective sites;
wherein a respective process manager server operative on a first site creates the new process on the first site in response to the system call;
wherein the step of providing in memory of at least one site a designation of sites involves providing a designation of respective ports that correspond to respective process manager servers operative on respective sites for which respective process directory fragments include at least one unallocated slot; and
wherein the step of selecting a site involves selecting a respective port from the designation of ports.

5. The method of claim 1 further including:
providing different respective process manager servers operative on different respective sites;
wherein a respective process manager server operative on a first site creates the new process on the first site in response to the system call;
wherein the step of providing in memory of at least one site a designation of sites involves providing a designation of respective ports that correspond to respective process manager servers operative on respective sites for which respective process directory fragments include at least one unallocated slot;
wherein the step of selecting a site involves selecting a respective port from the designation of ports; and
wherein the step of referencing a respective process identification involves a respective second process manager server identified by the selected port associating the respective process identification corresponding to the new process with a slot in a respective process directory fragment on the site on which the second process manager server is operative.

6. The method of claim 1 further including:
providing different respective process manager servers operative on different respective sites;
wherein a respective process manager server operative on a first site creates the new process on the first site in response to the system call; and
wherein the step of providing in memory of at least one site a designation of sites involves providing a process group manager server which provides a designation of process manager servers operative on respective sites for which respective process directory fragments include at least one unallocated slot;
wherein the step of selecting a respective site from the designation involves the first process manager server sending a message to the process group server requesting selection of a respective process manager server from the designation; and
wherein the step of referencing involves the process group manager sending a message to the selected process server requesting that a respective process identification corresponding to the new process be associated with a slot in a respective process directory fragment on a respective site on which the selected process manager server is operative.

7. The method of claim 1,
wherein said step of referencing a new process identification involves providing such reference in a process directory structure fragment slot on a site other than the respective site on which the new process is operative.

8. The method of claim 1, wherein said step of referencing a new process identification involves providing such reference in a process directory structure fragment slot on a site other than the respective site on which the new process is operative; and including the further step of:

providing a new process structure in site memory on the respective site on which the new process is operative, such new process structure providing a reference to the other site which includes the slot with the reference to the new process identification.

9. The method of claim 1 further including:

providing different respective process manager servers operative on different respective sites;

wherein a respective process manager server operative on a first site creates the new process on the first site in response to the system call;

wherein the step of providing in memory of at least one site a designation of sites involves providing a designation of process manager servers operative on respective sites for which respective process directory fragments include at least one unallocated slot; and wherein said step of referencing a new process identification involves providing such reference in a process directory structure fragment slot on a site other than the first site; and including the further step of:

providing a new process structure in site memory on the first site, such new process structure providing a reference to the other site which includes the slot with the reference to the new process identification.

10. A method for creation of a process in a multicomputer system which includes multiple sites interconnected by high speed data links, each site including a local processor and local memory and local serverized operating system which includes a local process manager server addressable through an associated process manager port identifier, the system further including a messaging facility for controlling the transfer of messages between different processes operative on different sites of the system, the method comprising the steps of:

providing a process directory structure distributed across multiple sites such that different site memories include different fragments of the process directory structure, such fragmented process directory structure including a multiplicity of slots for referencing a multiplicity of process port identifiers;

providing a process directory port group structure in site memory of at least one of the sites which references respective port identifiers associated with respective process managers operative on respective sites for which respective process directory fragments include unallocated slots;

providing a process directory port group manager operative on at least one of the sites;

issuing call to a respective process manager server, such call requesting a create a new process operation;

transferring a first message from the respective process manager receiving the call to the process directory port group manager, such first message requesting allocation of a slot;

transferring a second message from the process directory port group manager to a process manager associated with one of the port identifiers stored in the process directory port group structure, such second message requesting to allocate a slot in the process directory fragment of such process manager receiving such second message;

completing the new process creation operation on the site that contains the process manager receiving the call requesting a create a new process operation; and providing a reference to a new process port identification associated with the new process in a slot of the process directory fragment on the site of process manager receiving the second message.

11. The method of claim 10, wherein the process directory port group structure does not include the port identifier associated with the process manager receiving the call requesting a create a new process operation; and wherein said step of providing a reference to a new process port identification involves providing such reference in a process directory structure fragment slot on a site other than the site of the process manager receiving the call requesting a create a new process operation.

12. The method of claim 10, wherein the process directory port group structure does not include the port identifier associated with the process manager receiving the call requesting a create a new process operation;

wherein said step of providing a reference to a new process port identification involves providing such reference in a process directory structure fragment slot on a site other than the site of the process manager receiving the call requesting a create a new process operation; and including the further step of:

providing a new process structure associated in site memory with the new process, such new process structure providing a reference to the other site which includes the slot with the reference to the new process port identification.

13. A method of process migration between sites in a multicomputer system which includes multiple sites interconnected by high speed data links, each site including a local processor and local memory a distributed process directory which is distributed across multiple sites such that different site memories include different fragments of the process directory and such that the distributed process directory includes a multiplicity of slots, the method comprising the steps of:

transferring a process, which is operative on a first site and which is referenced in a slot of a respective process directory fragment on the first site, from the first site to a second site; and maintaining the reference to the transferred process in the slot of the respective process directory fragment on the first site.

14. The method of claim 13 including the further step of:

destroying a copy of the respective transferred process operative on the first site.

15. The method of claim 13 including the further step of:

providing a new process structure associated in second site memory with the transferred process, such new process structure providing a reference to the first site which includes the slot with the reference to the transferred process.

* * * * *